(12) United States Patent
Goodwin et al.

(10) Patent No.: US 12,723,943 B2
(45) Date of Patent: Sep. 1, 2026

(54) APPARATUSES, SYSTEMS AND METHODS FOR VIAL SEAL INSPECTION

(71) Applicant: AMGEN INC., Thousand Oaks, CA (US)

(72) Inventors: Al Patrick Goodwin, Dunleer (IE); Joseph Peter Bernacki, Thousand Oaks, CA (US); Thomas Clark Pearson, Newbury Park, CA (US); Graham F. Milne, Ventura, CA (US); Jonathan Parsons, Thousand Oaks, CA (US); Corey Bishop, Thousand Oaks, CA (US); Barry Donohoe, Thousand Oaks, CA (US); Osvaldo Perez-Varela, Guaynabo, PR (US)

(73) Assignee: AMGEN INC., Thousand Oaks, CA (US)

( * ) Notice: Subject to any disclaimer, the term of this patent is extended or adjusted under 35 U.S.C. 154(b) by 41 days.

(21) Appl. No.: 18/685,086

(22) PCT Filed: Aug. 22, 2022

(86) PCT No.: PCT/US2022/040983
§ 371 (c)(1),
(2) Date: Feb. 20, 2024

(87) PCT Pub. No.: WO2023/027968
PCT Pub. Date: Mar. 2, 2023

(65) Prior Publication Data

US 2024/0344920 A1 Oct. 17, 2024

Related U.S. Application Data

(60) Provisional application No. 63/235,834, filed on Aug. 23, 2021.

(51) Int. Cl.
*G01M 3/38* (2006.01)
*G01B 11/25* (2006.01)
*G01N 21/90* (2006.01)

(52) U.S. Cl.
CPC ........... *G01M 3/38* (2013.01); *G01B 11/2522* (2013.01); *G01N 21/909* (2013.01); *G01N 2201/0612* (2013.01)

(58) Field of Classification Search
CPC .... G01N 21/03; G01N 35/0098; G01N 21/76; G01N 21/01; G01N 35/10;
(Continued)

(56) References Cited

U.S. PATENT DOCUMENTS 6,974,964 B1 * 12/2005 Wang .................. A61C 9/0053 250/559.22
2020/0033271 A1 * 1/2020 Boira Bonhora ..... G06T 7/0002
2020/0126210 A1 * 4/2020 Li ......................... G06F 16/532

FOREIGN PATENT DOCUMENTS

CN 109196338 B * 9/2021 ............. G01N 21/90
GB 2135447 A * 8/1984 ......... G01B 11/2425
JP 4328333 B2 * 9/2009

OTHER PUBLICATIONS

International Search Report for Application No. PCT/US2022/040983 mailed Dec. 14, 2022.

(Continued)

*Primary Examiner* — Michael P Stafira
(74) *Attorney, Agent, or Firm* — MARSHALL, GERSTEIN & BORUN LLP

(57) ABSTRACT

An apparatus, system, or method for vial seal inspection may be based on three-dimensional data that is representative of at least a portion of a vial seal. More particularly, apparatuses, systems, and methods for vial seal inspection may include at least one laser triangulation sensor.

20 Claims, 38 Drawing Sheets

(58) Field of Classification Search

CPC ......... G01N 2035/00346; G01N 21/13; G01N 21/763; G01N 2333/005; G01N 2333/195; G01N 33/56911; G01N 33/54333; G01N 2035/00356; G01N 35/00732; G01N 21/90; G01N 21/8806; G01N 27/44721; G01N 21/05; G01N 21/6428; G01N 27/44704; G01N 35/0029; G01N 21/9054; G01N 27/447; G01N 27/44726; G01N 27/44747; G01N 27/44795; G01N 30/74; G01N 21/6452; G01N 25/72; G01N 21/9508; G01N 35/1079; G01N 21/3504; G01N 2201/024; G01N 33/543; G01N 2035/00287; G01N 2291/02854; G01N 33/48728; G01N 21/59; G01N 35/1065; G01N 21/9081; G01N 21/909; G01N 24/08; G01N 27/3273; G01N 27/745; G01N 29/265; G01N 33/536; G01N 33/58; G01N 33/582; G01N 35/00722; G01N 21/00; G01N 33/54326; G01N 2035/00158; G01N 21/66; G01N 2201/06113; G01N 2291/0226; G01N 2291/048; G01N 2291/106; G01N 2291/2695; G01N 29/0609; G01N 29/11; G01N 29/26; G01N 30/6095; G01N 33/50; G01N 33/54373; G01N 1/22; G01N 15/1031; G01N 2021/8845; G01N 21/0303; G01N 21/8851; G01N 21/9027; G01N 2201/062; G01N 2291/044; G01N 31/22; G01N 33/5302; G01N 33/54393; G01N 35/00623; G01N 35/1011; G01N 35/1016; G01N 1/2202; G01N 15/0255; G01N 2001/4083; G01N 2021/8854; G01N 2021/8883; G01N 2035/00188; G01N 21/648; G01N 21/85; G01N 21/94; G01N 21/95; G01N 2201/04; G01N 2291/02872; G01N 2291/0421; G01N 2291/0422; G01N 2291/0556; G01N 2291/2636; G01N 27/44782; G01N 29/04; G01N 29/07; G01N 29/2487; G01N 33/54306; G01N 33/54388; G01N 35/02; G01N 35/08; G01N 2021/845; G01N 2035/00495; G01N 2035/0429; G01N 2035/1018; G01N 21/07; G01N 21/253; G01N 21/3581; G01N 21/51; G01N 21/534; G01N 21/63; G01N 21/64; G01N 21/951; G01N 21/9515; G01N 2201/125; G01N 2291/0258; G01N 2333/575; G01N 2333/62; G01N 2333/91188; G01N 29/225; G01N 33/0027; G01N 33/02; G01N 33/08; G01N 33/085; G01N 33/5088; G01N 33/5017; G01N 33/5061; G01N 33/5073; G01N 33/5308; G01N 33/5434; G01N 33/56983; G01N 33/573; G01N 33/74; G01N 33/743; G01N 33/82; G01N 33/92; G01N 35/1002; G01N 1/32; G01N 17/04; G01N 2001/4088; G01N 2021/0187; G01N 2021/0325; G01N 2021/0346; G01N 2021/0364; G01N 2021/3595; G01N 2030/3007; G01N 2030/3015; G01N 2030/303; G01N 2035/0091; G01N 2035/0401; G01N 21/031; G01N 21/33; G01N 21/3554; G01N 21/3577; G01N 21/359; G01N 21/61; G01N 21/645; G01N 21/6458; G01N 21/65; G01N 21/718; G01N 21/78; G01N 21/9009; G01N 21/9501; G01N 21/95623; G01N 2201/0227; G01N 2201/0636; G01N 2291/0232; G01N 27/02; G01N 27/44708; G01N 27/44773; G01N 29/221; G01N 30/02; G01N 30/60; G01N 30/6047; G01N 30/6052; G01N 30/606; G01N 33/0011; G01N 33/0029; G01N 33/0047; G01N 33/12; G01N 33/146; G01N 33/28; G01N 33/32; G01N 33/442; G01N 33/487; G01N 33/54353; G01N 33/54387; G01N 33/551; G01N 33/569; G01N 33/9493; G01N 35/025; G01N 1/14; G01N 1/36; G01N 11/16; G01N 15/042; G01N 15/0612; G01N 15/10; G01N 15/1023; G01N 15/149; G01N 2009/006; G01N 2021/054; G01N 2021/6417; G01N 2021/6463; G01N 2021/3482; G01N 2021/8887; G01N 2035/00237; G01N 2035/00306; G01N 2035/0441; G01N 21/276; G01N 21/31; G01N 21/6456; G01N 21/658; G01N 21/7703; G01N 21/88; G01N 2201/023; G01N 2201/061; G01N 2291/022; G01N 2291/023; G01N 2291/02898; G01N 2291/105; G01N 2291/2626; G01N 2291/2634; G01N 2291/267; G01N 223/04; G01N 233/938; G01N 2500/02; G01N 27/023; G01N 21/8422; G01N 21/954; G01N 2201/0484; G01N 2201/104; G01N 2333/4709; G01N 2333/705; G01N 2333/96463; G01N 3/02; G01N 33/502; G01N 33/5076; G01N 33/577; G01N 33/6875; G01N 1/24; G01N 15/0227; G01N 15/06; G01N 15/075; G01N 15/0826; G01N 2021/6439; G01N 2021/7786; G01N 2021/8893; G01N 2021/8905; G01N 2035/0406; G01N 2035/0408; G01N 2035/0415; G01N 21/6486; G01N 2201/02; G01N 2201/0612; G01N 2201/0631; G01N 2201/0696; G01N 2201/1296; G01N 2333/77; G01N 2333/79; G01N 2400/00; G01N 2500/10; G01N 27/92; G01N 2800/24; G01N 30/16; G01N 33/4833; G01N 33/5067; G01N 33/57484; G01N 33/6842; G01N 33/689; G01N 33/94; G01N 33/96; G01N 15/1434; G01N 2021/399; G01N 2021/646; G01N 2035/00811; G01N 2035/0439; G01N 21/3563; G01N 21/39; G01N 21/84; G01N 21/8483; G01N 21/956; G01N 21/95607; G01N 2201/06146; G01N 2333/58; G01N 2333/70596; G01N 2333/71; G01N 2333/7456; G01N 2333/988; G01N 2430/10; G01N 27/44743; G01N 27/44791; G01N 2800/367; G01N 33/5029; G01N 33/5079; G01N 33/5085; G01N 33/5094; G01N 33/56966; G01N 33/57492; G01N 33/5767; G01N 33/66; G01N 33/80; G01N 1/10; G01N 1/34; G01N 1/4077; G01N 13/00; G01N

15/0211; G01N 15/1459; G01N 2015/0238; G01N 2015/025; G01N 2015/0294; G01N 2015/103; G01N 2021/6421; G01N 2021/6434; G01N 21/6408; G01N 21/80; G01N 21/9045; G01N 2333/4704; G01N 2333/521; G01N 2333/922; G01N 2500/20; G01N 27/26; G01N 27/327; G01N 27/3271; G01N 27/3278; G01N 27/4145; G01N 2800/105; G01N 2800/122; G01N 2800/26; G01N 2800/28; G01N 2800/302; G01N 2800/325; G01N 2800/385; G01N 30/24; G01N 30/32; G01N 33/0006; G01N 33/49; G01N 33/5047; G01N 33/54366; G01N 33/566; G01N 33/56972; G01N 33/57423; G01N 33/57446; G01N 33/6863; G01N 33/9446; G01N 33/9486; G01N 1/02; G01N 1/28; G01N 1/31; G01N 1/40; G01N 1/4022; G01N 11/02; G01N 15/02; G01N 15/0205; G01N 15/12; G01N 2001/007; G01N 2001/028; G01N 2001/4027; G01N 2001/4038; G01N 2015/019; G01N 2015/0846; G01N 2015/1006; G01N 2021/7759; G01N 2021/8427; G01N 2021/8488; G01N 2021/8816; G01N 2021/8858; G01N 2021/8861; G01N 2021/8908; G01N 2030/004; G01N 2030/027; G01N 2030/162; G01N 2030/285; G01N 2030/383; G01N 2030/405; G01N 2030/8435; G01N 2035/00415; G01N 2035/00524; G01N 2035/00742; G01N 2035/0405; G01N 21/255; G01N 21/278; G01N 21/35; G01N 21/4738; G01N 21/532; G01N 27/404; G01N 27/4473; G01N 27/72; G01N 27/9046; G01N 2880/52; G01N 29/036; G01N 29/0681; G01N 29/069; G01N 29/222; G01N 29/2418; G01N 29/2437; G01N 29/4427; G01N 29/4454; G01N 29/46; G01N 30/14; G01N 33/0036; G01N 33/14; G01N 33/15; G01N 33/22; G01N 33/2835; G01N 33/48; G01N 33/53; G01N 33/54313; G01N 33/57525; G01N 33/581; G01N 33/6872; G01N 35/04; G01N 35/1009; G01N 7/00; G01N 7/02; G01N 9/002; G01N 15/1429; G01N 15/1427; G01N 2015/144; G01N 2015/1493; G01N 2015/1029; G01N 2015/1445; G01N 2015/1452; G01N 2015/1472; G01N 2015/1477; G01N 2015/1497; G01N 15/1433; G01N 2015/1027; G01N 15/00; G01N 2021/1765; G01N 21/17; G01N 21/8803; G01N 21/958; G01N 35/0099; G01N 2021/8848; G01N 2800/52; G01N 21/9036; G01N 33/6893; G01N 30/06; G01N 2500/00; G01N 2800/10; G01N 2333/96486; G01N 33/6887; G01N 33/0081; G01N 21/9018; G01N 30/88; G01N 25/00; G01N 21/896; G01N 21/21; G01N 21/892; G01N 23/2273; G01N 2500/04; G01N 2001/2229; G01N 21/93; G01N 2201/10; G01N 33/5005; G01N 33/5008; G01N 33/86; G01N 2021/0112; G01N 27/00; G01N 33/5438; G01N 33/6896; G01N 2201/103; G01N 2201/106; G01N 27/3274; G01N 23/083; G01N 2800/042; G01N 2800/32; G01N 33/5044; G01N 1/2226; G01N 21/952; G01N 2800/347; G01N 33/5011; G01N 33/5091; G01N 33/68; G01N 35/1004; G01N 2021/8822; G01N 23/16; G01N 23/18; G01N 33/48707; G01N 21/274; G01N 2560/00; G01N 2800/60; G01N 33/00; G01N 33/5023; G01N 33/6854; G01N 35/00029; G01N 15/082; G01N 2035/00138; G01N 2035/00168; G01N 21/8914; G01N 21/9072; G01N 2201/13; G01N 2223/60; G01N 23/04; G01N 23/10; G01N 2333/4737; G01N 27/227; G01N 27/3272; G01N 2800/304; G01N 33/0096; G01N 33/57407; G01N 33/6848; G01N 1/312; G01N 2001/2223; G01N 2021/157; G01N 2021/5969; G01N 2021/8864; G01N 2030/085; G01N 2030/121; G01N 21/15; G01N 21/8901; G01N 2201/06106; G01N 2201/066; G01N 2201/0662; G01N 2333/916; G01N 2333/96461; G01N 2800/04; G01N 2800/2821; G01N 33/5058; G01N 33/5082; G01N 33/574; G01N 1/2813; G01N 2021/9063; G01N 2035/00752; G01N 21/25; G01N 33/006; G01N 21/6445; G01N 21/82; G01N 2001/1047; G01N 2223/419; G01N 23/046; G01N 23/20008; G01N 2333/165; G01N 2333/32; G01N 2333/462; G01N 2333/4703; G01N 2333/4706; G01N 2333/49; G01N 2333/515; G01N 2333/52; G01N 2333/525; G01N 2333/54; G01N 2333/2412; G01N 5333/5418; G01N 2333/5421; G01N 2333/545; G01N 2333/56; G01N 2333/70575; G01N 2333/70578; G01N 2333/726; G01N 2333/755; G01N 2333/765; G01N 2333/81; G01N 2333/91215; G01N 2333/936; G01N 2496/00; G01N 2496/10; G01N 27/127; G01N 27/3275; G01N 27/3277; G01N 27/447556; G01N 2800/102; G01N 2800/164; G01N 2800/30; G01N 2800/7047; G01N 30/0005; G01N 30/72; G01N 30/7206; G01N 33/447; G01N 33/4877; G01N 33/4925; G01N 33/5014; G01N 33/5041; G01N 33/5055; G01N 33/57426; G01N 33/5761; G01N 33/6812; G01N 33/6851; G01N 33/6866; G01N 33/6869; G01N 33/84; G01N 1/04; G01N 1/16; G01N 1/26; G01N 1/2806; G01N 1/30; G01N 1/4044; G01N 15/14; G01N 2001/005; G01N 2001/2846; G01N 2001/2893; G01N 2001/388; G01N 2015/084; G01N 2021/4714; G01N 2021/638; G01N 2021/6484; G01N 2021/8411; G01N 2021/8809; G01N 2021/933; G01N 2021/95615; G01N 2030/025; G01N 2030/062; G01N 2030/126; G01N 2030/146; G01N

2030/167; G01N 2030/324; G01N 2030/8813; G01N 2035/00782; G01N 2035/0437; G01N 2035/0479; G01N 2035/1027; G01N 24/251; G01N 21/272; G01N 21/314; G01N 21/41; G01N 21/45; G01N 21/4788; G01N 21/55; G01N 21/6454; G01N 21/87; G01N 21/89; G01N 21/91; G01N 22/04; G01N 2201/0627; G01N 2201/063; G01N 2201/1235; G01N 2201/129; G01N 2291/015; G01N 2291/0256; G01N 2291/0289; G01N 2291/2691; G01N 23/043; G01N 23/2251; G01N 2333/11; G01N 2333/16; G01N 2333/43552; G01N 2333/43573; G01N 2333/4626; G01N 2333/47; G01N 2333/475; G01N 2333/4753; G01N 2333/565; G01N 2333/70571; G01N 2333/715; G01N 2333/745; G01N 2333/775; G01N 2333/8139; G01N 2333/9015; G01N 2333/902; G01N 2333/90212; G01N 2333/91501; G01N 2333/91057; G01N 2333/91097; G01N 2333/91171; G01N 2333/912; G01N 2333/9125; G01N 2333/924; G01N 2333/966; G01N 2400/10; G01N 2405/04; G01N 2440/14; G01N 2469/20; G01N 2496/05; G01N 25/20; G01N 2510/00; G01N 27/221; G01N 27/30; G01N 27/308; G01N 2800/044; G01N 2800/065; G01N 2800/12; G01N 2800/20; G01N 2800/202; G01N 2800/222; G01N 2800/2814; G01N 2800/2835; G01N 2800/387; G01N 2800/50; G01N 29/045; G01N 29/048; G01N 29/12; G01N 29/14; G01N 29/241; G01N 29/2456; G01N 29/28; G01N 29/343; G01N 29/348; G01N 30/04; G01N 30/30; G01N 30/34; G01N 30/7266; G01N 30/90; G01N 31/229; G01N 33/0095; G01N 33/386; G01N 33/48778; G01N 33/5026; G01N 33/521; G01N 33/563; G01N 33/564; G01N 33/686; G01N 33/6878; G01N 33/9433; G01N 33/948; G01N 35/00603; G01N 35/0092; G01N 35/028; G01N 35/1095; G01N 5/04; G01B 11/14; G01B 11/2522; G01B 11/24; G01B 11/25; G01B 17/02; G01B 11/026; G01B 11/16; G01B 11/245; G01B 11/26; G01B 15/00; G01B 11/0691; G01B 5/02; G01B 5/06; G01B 11/0608; G01B 11/2513; G01B 11/303; G01B 7/023; G01B 7/10; G01B 7/105; G01B 11/00; G01B 11/08; G01B 11/2518; G01B 11/02; G01B 5/08; G01B 21/10; G01B 11/105; G01B 11/2408; G01B 11/272; G01B 5/26; G01B 11/2454; G01B 5/061; G01B 5/12; G01B 7/12; G01B 11/06; G01B 11/0625; G01B 21/08; G01B 11/022; G01B 11/03; G01B 11/2509; G01B 11/30; G01B 11/306; G01B 21/00; G01M 3/38; G01M 3/36; G01M 3/226; G01M 3/3209; G01M 3/3272; G01M 3/329; G01M 13/005; G01M 3/32; G01M 3/366; G01M 3/363; G01M 3/007; G01M 3/20; G01M 3/2807; G01M 3/26; G01M 3/2846; G01M 3/3218; G01M 3/40; G01M 11/083; G01M 3/02; G01M 3/3263; G01M 3/34; G01M 13/00; G01M 13/003; G01M 3/083; G01M 3/086; G01M 3/202; G01M 3/227; G01M 3/229; G01M 3/24; G01M 3/2853; G01M 3/2876; G01M 3/3281; G01M 3/16; G01M 3/186; G01M 3/04; G01M 3/205; G01M 11/02; G01M 3/002; G01M 3/223; G01M 3/224; G01M 3/3236; G01M 99/00

See application file for complete search history.

(56) References Cited

OTHER PUBLICATIONS

Written Opinion for Application No. PCT/US2022/040983 mailed Dec. 14, 2022.

* cited by examiner

400g

445g

400h

445h

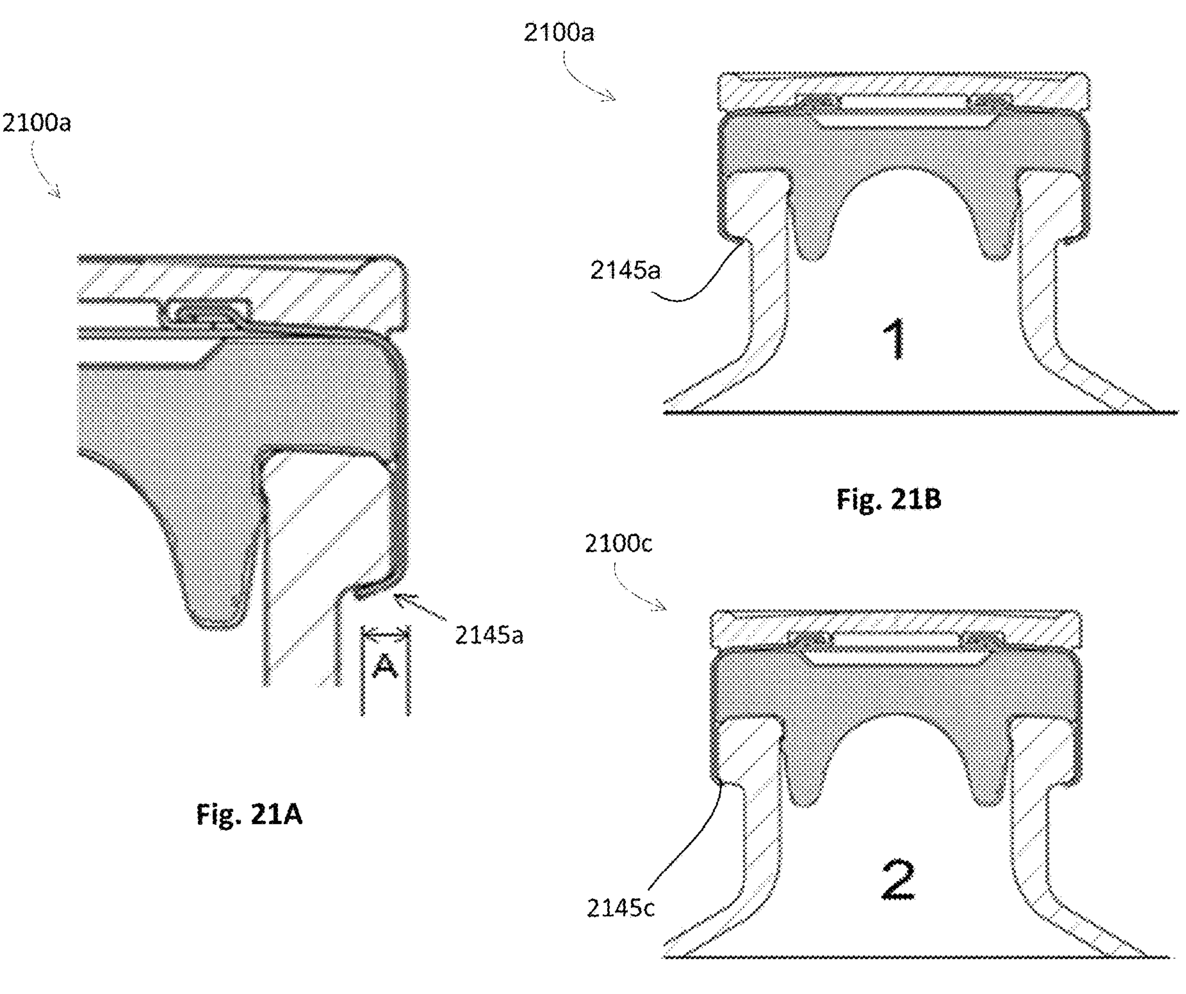
Fig. 21A
Fig. 21B
Fig. 21C
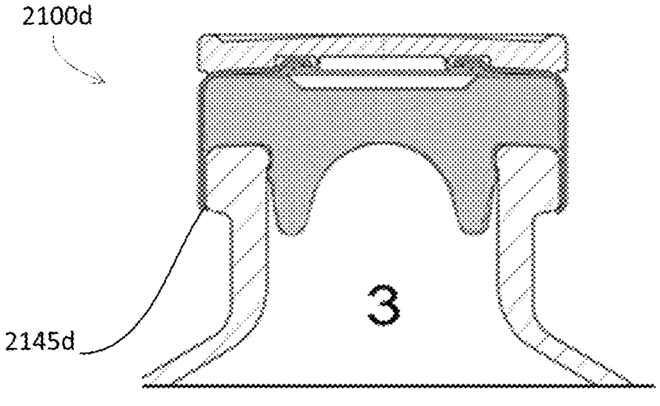
Fig. 21D

APPARATUSES, SYSTEMS AND METHODS FOR VIAL SEAL INSPECTION

CROSS-REFERENCE TO RELATED APPLICATION

This application is a U.S. national stage filing under 35 U.S.C. § 371 of International Application No. PCT/US2022/040983, filed Aug. 22, 2022, which claims priority to U.S. Provisional Patent Application No. 63/235,834, filed Aug. 23, 2021, the entire contents of each of which are hereby incorporated by reference herein.

FIELD OF DISCLOSURE

The present disclosure generally relates to apparatuses, systems, and methods for vial seal inspection using three-dimensional data that is representative of at least a portion of a vial seal. More particularly, the present disclosure relates to apparatuses, systems, and methods for vial seal inspection using a laser triangulation sensor.

BACKGROUND

Under FDA requirements, many products (e.g., filled and sealed vials of medicine, etc.) need to be 100% inspected. Vial seal crimp inspection is one example. Vial seal crimp inspection is currently implemented using two-dimensional (2D) vision-based inspection. Among other sources of error, known 2D vial seal crimp inspection is prone to errors due to associated illumination conditions.

Variations in crimp material (e.g., an anodized form of aluminum, etc.) may result in different levels of reflections. Therefore, when an associated 2D vision system is configured to, for example, detect defects on one batch of aluminum vial seals, the system may achieve success on the batch of sealed vials. However, future batches of sealed vials may not result in the same image(s) due to variations in seal surface finishing, slight variations in vial seal surface color, etc. Known 2D vial seal crimp inspection often includes illuminating an associated vial seal crimp area of the respective vials during inspection. All these issues may cause false fails (i.e., a false fail is a sealed vial having a good vial seal crimp erroneously identified as being a bad vial seal). In any event, known inspection system errors often result in false fails.

A vial seal crimping process often includes a mechanical process which may be performed after successful filling of an associated vial. As described in detail herein, the mechanical nature of vial seal crimping processes and/or variations in associated vials (e.g., a glass container, etc.) often results in vial seal crimp defects.

As part of a filled and sealed vial inspection, known 2D vial seal crimp inspection may be incorporated into an automatic visual inspection (AVI) system. In known vial seal inspection systems, a sealed vial may be rotated 360 degrees about a central axis of the vial, multiple two-dimensional (2D) images may be taken at various points about the vial rotation, and these 2D images may be analyzed using, for example, machine vision-based algorithms to detect seal defects. False fails often occur due to variations of associated 2D vision-based systems.

Apparatuses, systems, and methods are needed for vial seal inspection to reduce false fails compared to traditional two-dimensional vision-based vial seal inspection. Apparatuses, systems, and methods are needed for vial seal inspection using three-dimensional data that is representative of at least a portion of a vial seal surface. Apparatuses, systems, and methods are also needed for vial seal inspection using at least one laser triangulation device.

SUMMARY

A vial seal inspection system may include a vial seal distance data generation device configured to generate vial seal distance data. The vial seal distance data may be representative of a plurality of distance measurements correlated with points along at least a portion of a line that extends from a top of the vial seal to a bottom edge of the vial seal. The system may also include a vial seal periphery data generation device configured to generate vial seal periphery data. The vial seal periphery data may be representative of a plurality of points along at least a portion of a line that extends around a periphery of the vial seal. The system may further include a vial seal three-dimensional data generation module stored on a memory that, when executed by a processor, may cause the processor to generate vial seal three-dimensional data based on the vial seal distance data and the vial seal periphery data. The system may yet further include a vial seal inspection data generation module stored on a memory that, when executed by a processor, may cause the processor to generate vial seal inspection data based on a comparison of the vial seal three-dimensional data with previously classified vial seal three-dimensional data. The vial seal inspection data may be indicative of whether the vial seal includes a vial seal crimp.

In another embodiment, a vial seal inspection device may include a vial seal distance data generation sensor configured to generate vial seal distance data. The vial seal distance data may be representative of a plurality of distance measurements correlated with points along a line that extends from a top of the vial seal to a bottom edge of the vial seal. The device may also include a vial seal periphery data input. The vial seal periphery data input may be representative of a plurality of points along at least a portion of a line that extends around a periphery of the vial seal. The device may further include a vial seal three-dimensional model generation module stored on a memory that, when executed by a processor, may cause the processor to generate vial seal three-dimensional data based on the vial seal distance data and the vial seal periphery data.

In a further embodiment, a non-transitory computer-readable medium storing computer-readable instructions that, when executed by one or more processors, cause the one or more processors to generate vial seal three-dimensional data may include a vial seal distance data receiving module that, when executed by a processor, may cause the processor to receive vial seal distance data from a vial seal distance data generation device. The vial seal distance data may be representative of a plurality of distance measurements correlated with points along at least a portion of a line that extends from a top of the vial seal to a bottom edge of the vial seal. The computer-readable medium may also include a vial seal periphery data receiving module that, when executed by a processor, may cause the processor to receive vial seal periphery data. The vial seal periphery data may be representative of a plurality of points along at least a portion of a line that extends around a periphery of the vial seal. The computer-readable medium may further include a vial seal three-dimensional data generation module that, when executed by a processor, may cause the processor to generate vial seal three-dimensional data based on the vial seal distance data and the vial seal periphery data.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicated of the presence or absence of particular elements in any of the exemplary embodiments, except as may be explicitly delineated in the corresponding written description. Also, none of the drawings are necessarily to scale.

FIGS. 21A-D depict a series of vial profile views having varying amounts of seal material tucked under a lip of a vial neck.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercial feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Apparatuses, systems, and methods of the present disclosure may, for example, inspect a vial seal based on three-dimensional (3D) data that is representative of at least a portion of a vial seal. Vial seal inspection may occur in real time with respect to, for example, an associated vial seal crimping process.

The apparatuses, systems, and methods of the present disclosure may, for example, include at least one laser triangulation sensor in conjunction with vial seal periphery data, to provide X-axis data, Y-axis data, and Z-axis data that is representative of at least a portion of a vial seal. Sealed vials may be rejected with lower false fails using vial seal 3D data compared to vial seal crimp inspection systems based on two-dimensional data. The vial seal periphery data may be, for example, pre-determined (e.g., vial seal periphery data may be based on a perimeter length of at least a portion of a vial seal, vial seal periphery data may be based on a vial rotation time, etc.). Alternatively, or additionally, the vial seal periphery data may be generated via, for example, a feedback sensor output. Feedback sensor output data (i.e., X-axis data) may be directly correlated with respective Y-axis data, and Z-axis data. More broadly, Y-axis data and Z-axis data from a vial seal distance data generation sensor may be correlated with X-axis data representative of points along at least a portion of a perimeter of a vial seal.

Figure 1:
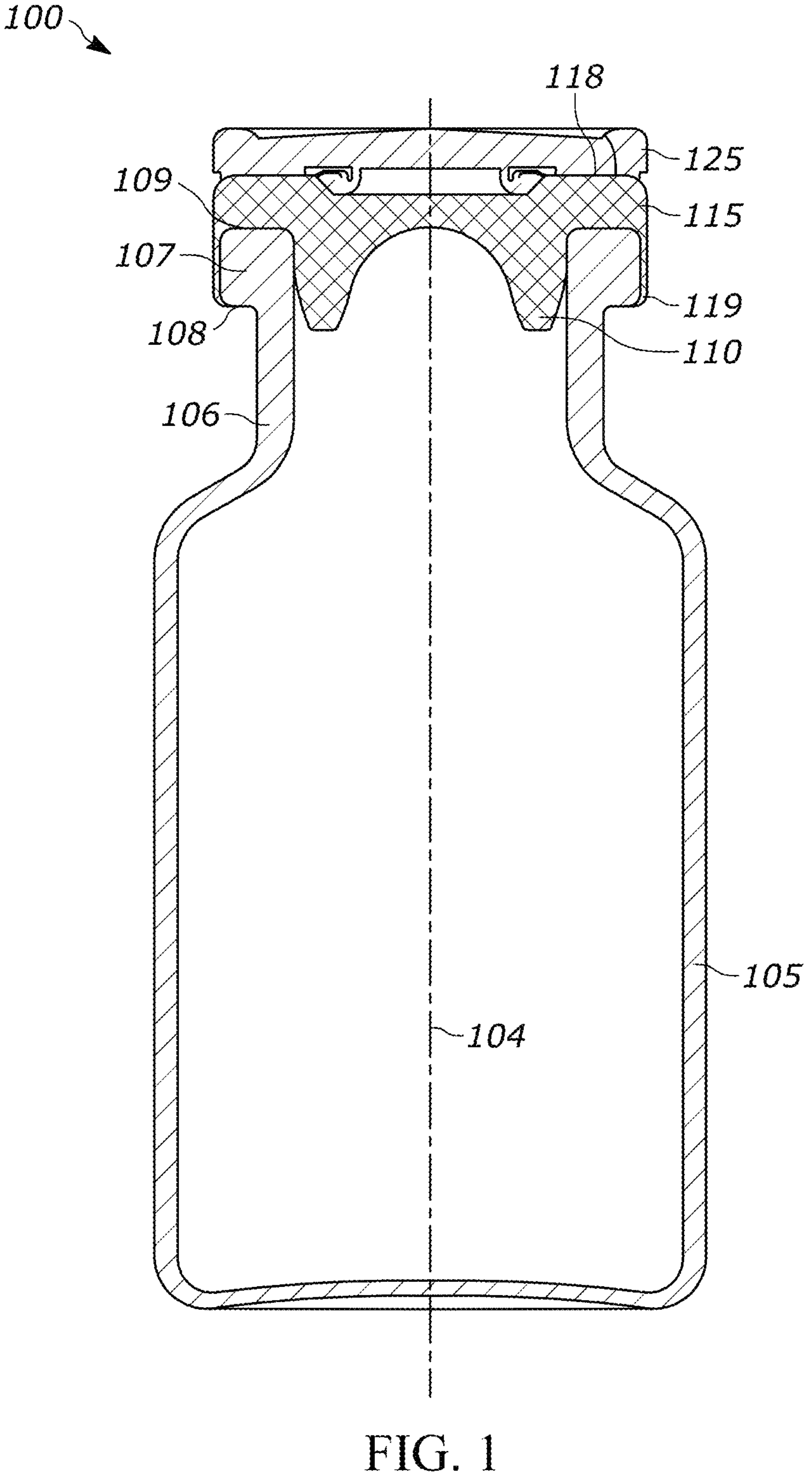
FIG. 1 depicts an example sealed vial having a flip cap.

Turning to FIG. 1, a sealed vial 100*a* may include a vial 105 (e.g., a glass body, etc.) having a central axis 104, a vial plug 110 (e.g., a rubber seal, etc.), a vial seal 115 (e.g., an aluminum seal, a metal seal, etc.) having an upper surface 118. The vial plug 110 may be at least partially integral with the vial seal 115. A sealed vial may also include a vial flip cap 125. A vial flip cap 125 may be at least partially integral with a vial seal 115.

A vial 105 may include a vial neck portion 106 having a vial lip 107 with a vial lip lower surface 108 and a vial lip upper surface 109. The sealed vial 100 may include a vial seal crimp surface 119 that at least partially extends parallel to the lower surface 108 of the vial lip 107 subsequent to the vial seal 115 being crimped onto the vial lip 107

Figure 2A:
FIGS. 2A-C depict example components for sealing a vial.
Figure 2A:
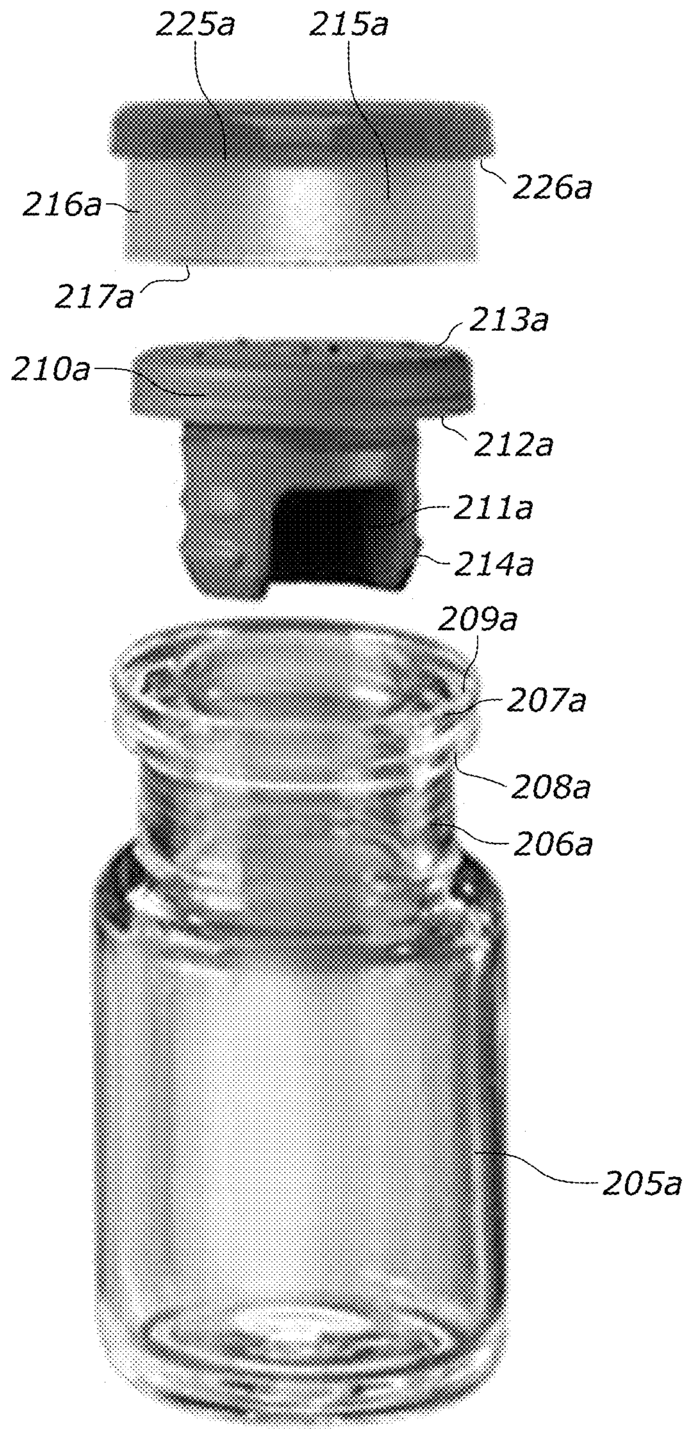
Figure 2B:
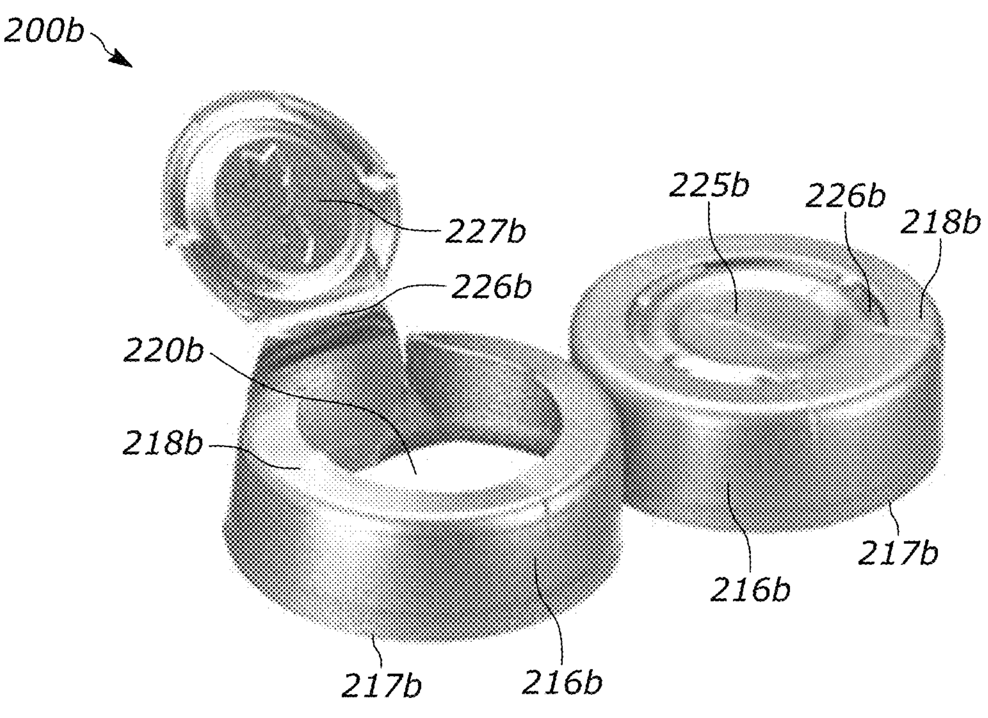
Figure 2C:
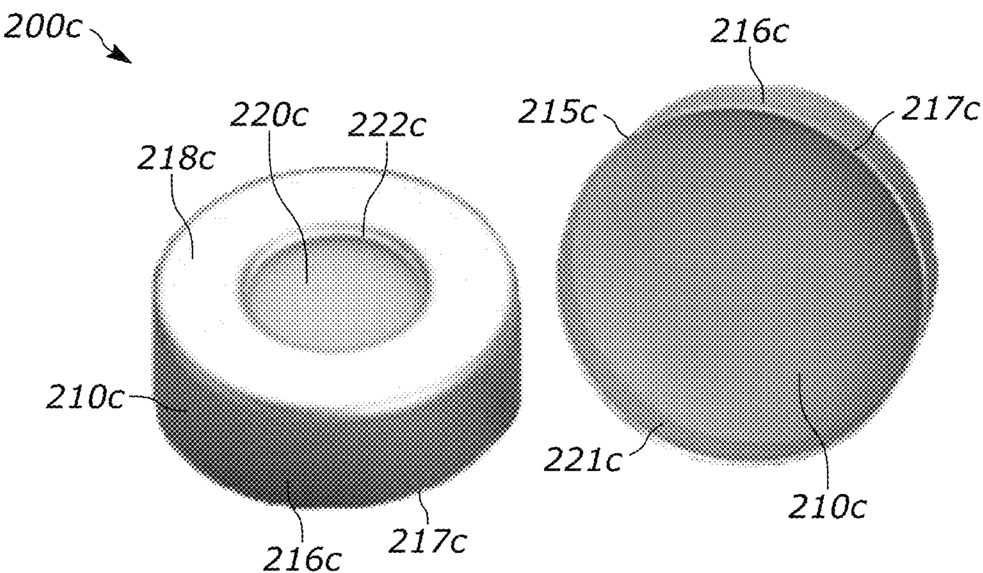

With reference to FIGS. 2A-C, components 200*a-c* for sealing a vial 205*a* may include a vial plug 210*a,c*, a vial seal 215*a-c*. The vial 205*a* may include a vial neck portion 206*a*, a vial lip 207*a* having a vial lip lower surface 208*a* and a vial lip upper surface 209*a*. The vial plug 210*a,c* may include a vial plug insert portion 211*a*, a vial plug lip 212*a*, a vial plug upper surface 213*a*, 220*c*, and a vial plug needle insert area 214*a*, 220*c*. The vial seal 215*a-c* may include a vial seal periphery surface 216*b-c*, a vial seal lower edge 217*b-c*, a vial seal upper surface 218*a-c*, a vial seal inner surface 221*c*, and a vial seal aperture 222*c*. The vial seal 215*b* may also include an integral vial flip top 225*b,c*. The vial flip top 225*b,c* may include a central portion 225*b* connected via a hinge 226*b*. The central portion 225*b* may be flipped to orientation 227*b*.

Figure 3:
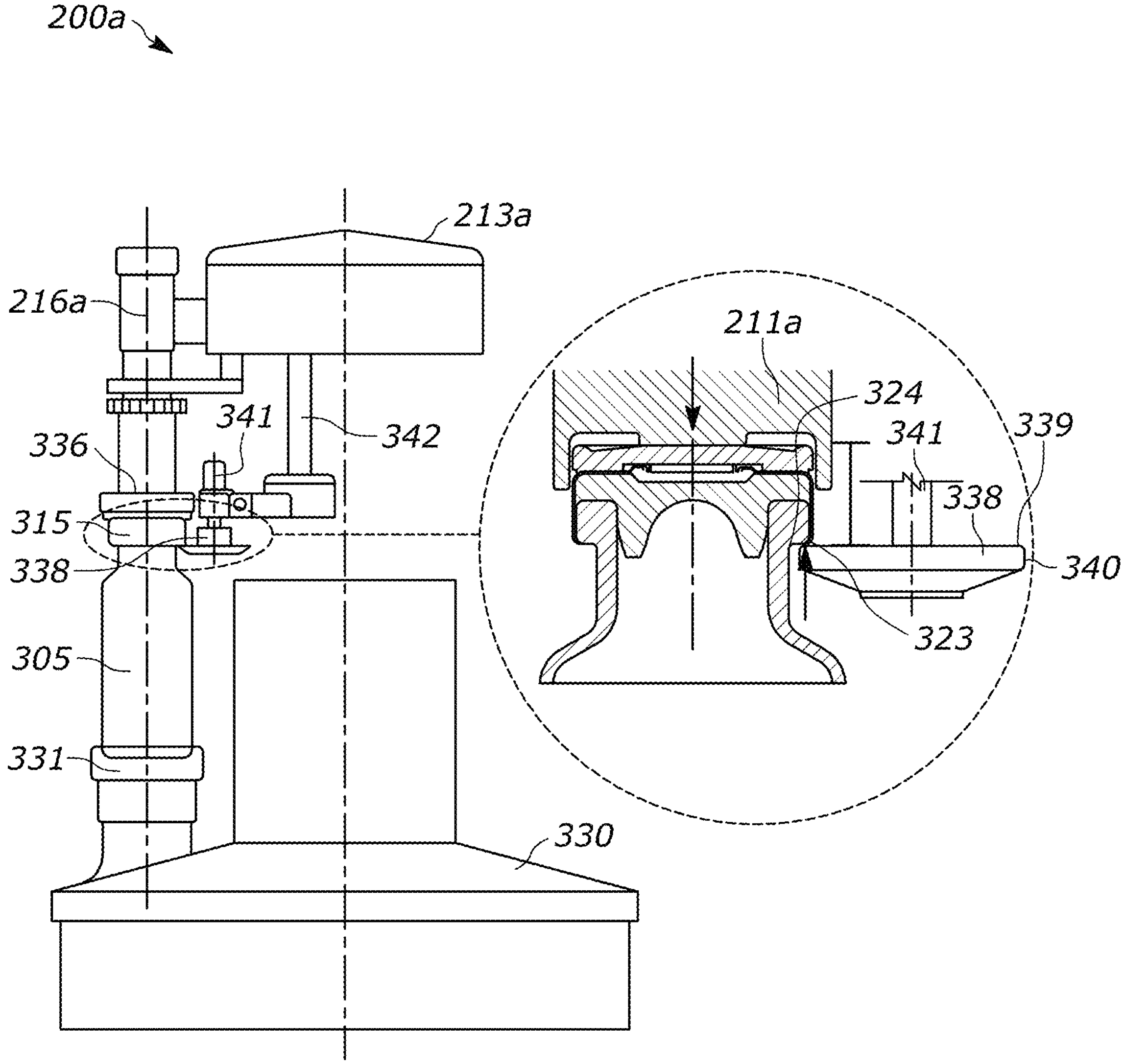
FIG. 3 depicts an example system for crimping a vial seal using high speed rotating blades.

Turning to FIG. 3, a vial seal crimping system 300 may include at least one high speed rotating blade 338

For information purposes, only some details of the vial seal crimping system are included in FIG. 3. The vial seal crimping system 300 may be a mechanical process. The metal blade 338 may move in on the vial seal 315, and may crimp 324 and bend 323 a portion of the vial seal 315 to form a vial seal crimp 119 around the vial lip lower surface 108, 208*a*. Because a vial seal crimping system 300 may include a highly mechanized process, combined with ongoing variations in the blades 338, and slight variations in vial lip 107, 207*a* dimensions, the vial seal crimping system 300 may be prone to defects with very few available process adjustments on the crimping process to decrease these defects. The apparatuses, systems, and methods of the present disclosure may incorporated 3D real time vial seal inspection. 3D vial seal inspection may simultaneously minimize false fails and may maximize defect detection when compared to 2D based vial seal crimp inspection.

Figure 4A:
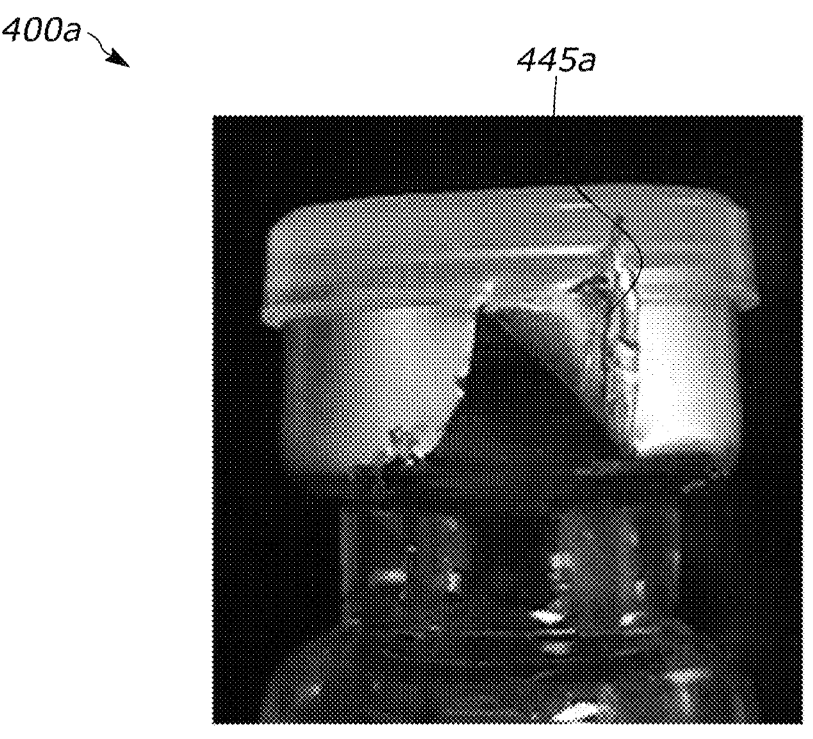
FIG. 4A depicts an example vial seal having a damaged periphery portion and crimp portion.
Figure 4B:
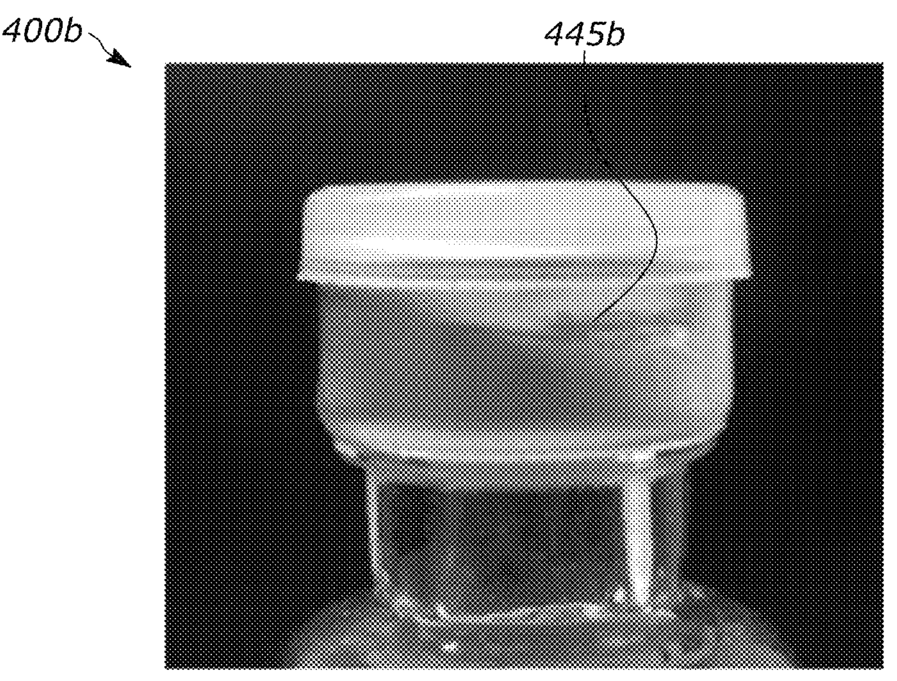
FIG. 4B depicts an example vial seal having a dented periphery portion.
Figure 4C:
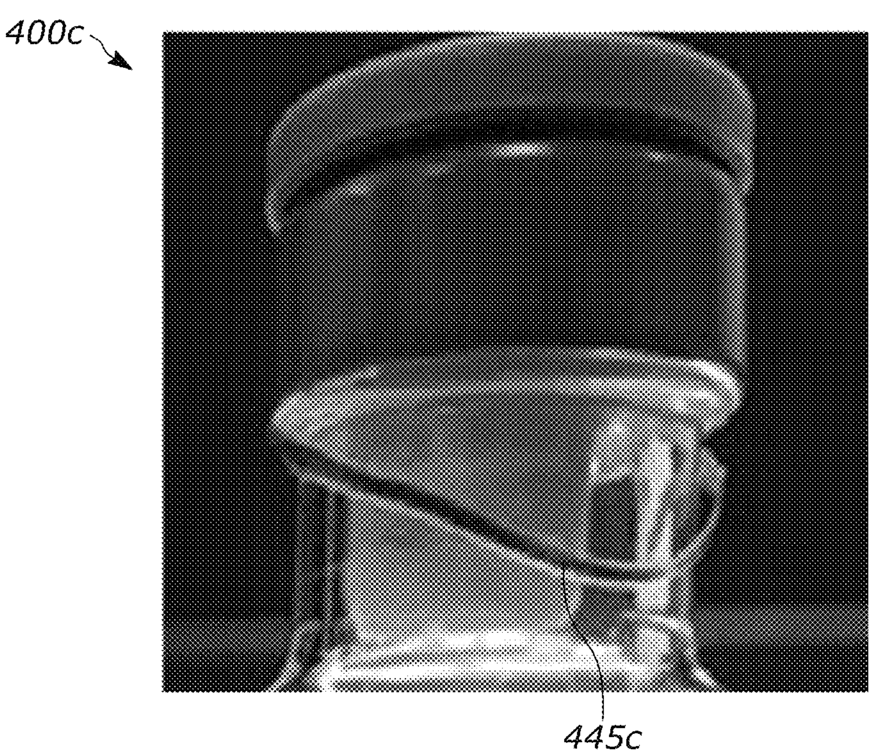
FIG. 4C depicts an example vial seal having a crimp portion partially torn off from a respective periphery portion.
Figure 4D:
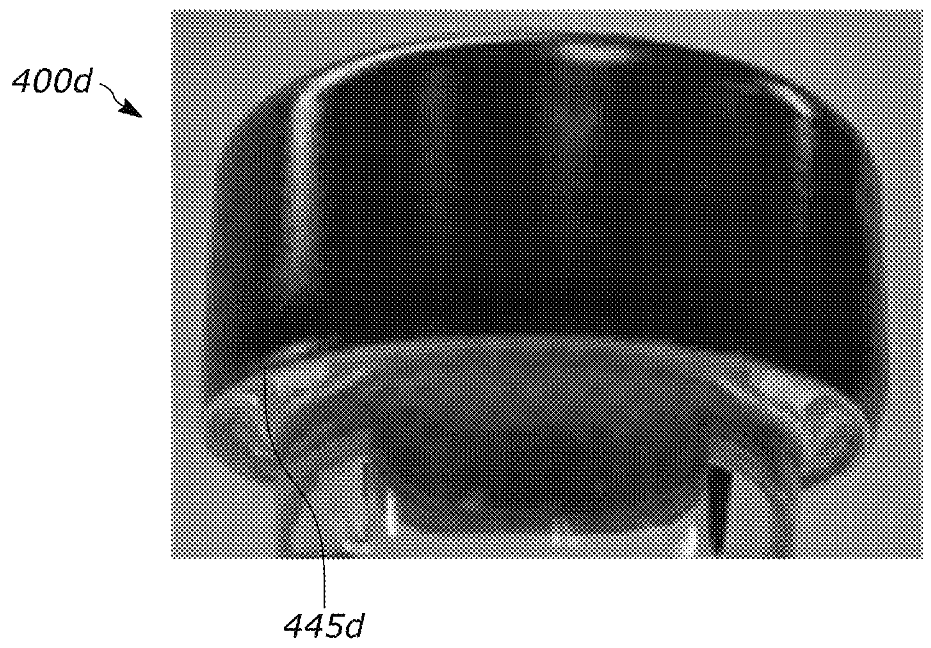
FIG. 4D depicts an example vial seal having a loose crimp portion.
Figure 4E:
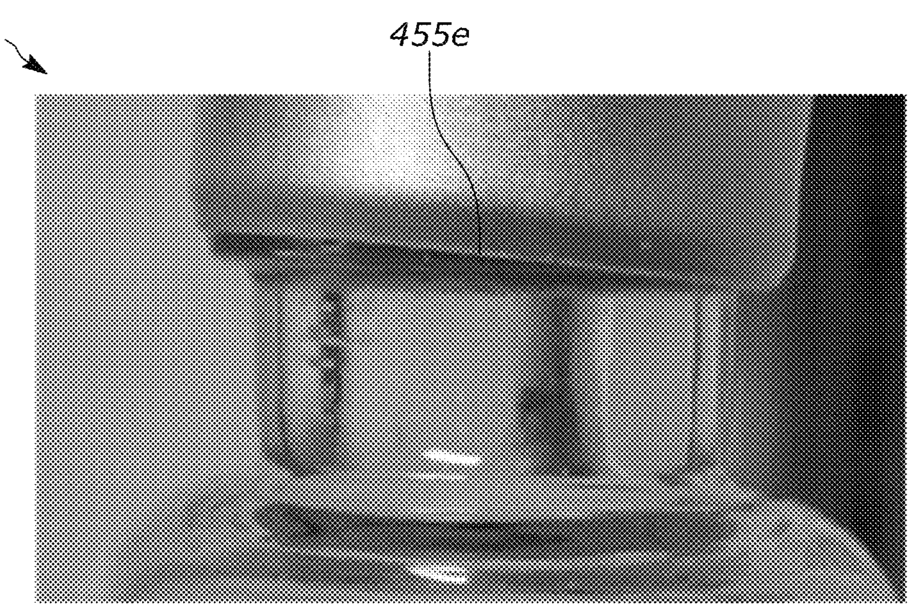
FIG. 4E depicts an example vial seal having a misaligned crimp portion.
Figure 4F:
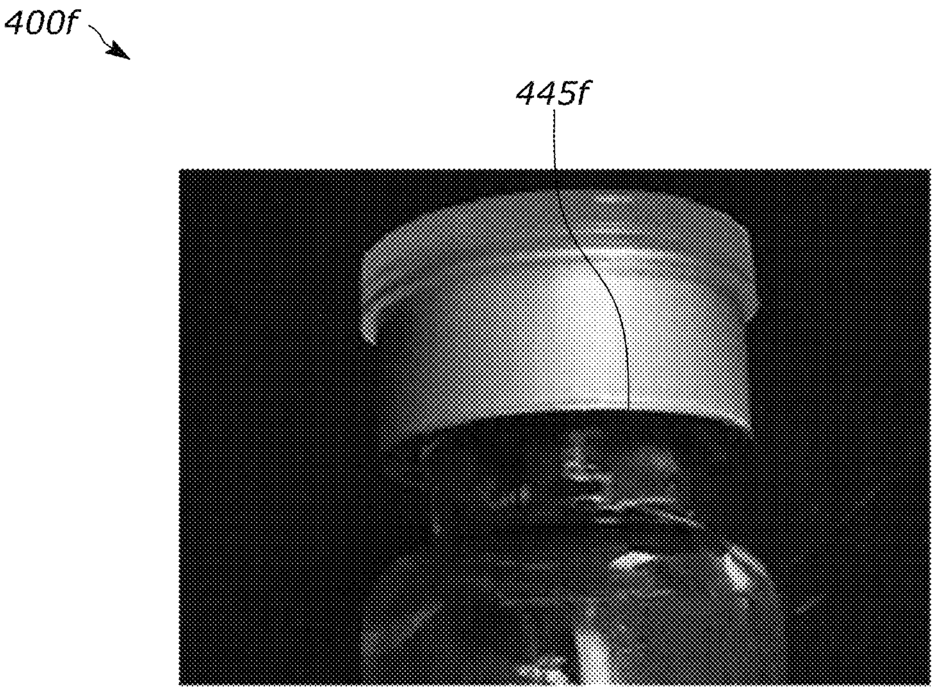
FIG. 4F depicts an example vial seal having no crimp portion.
Figure 4G:
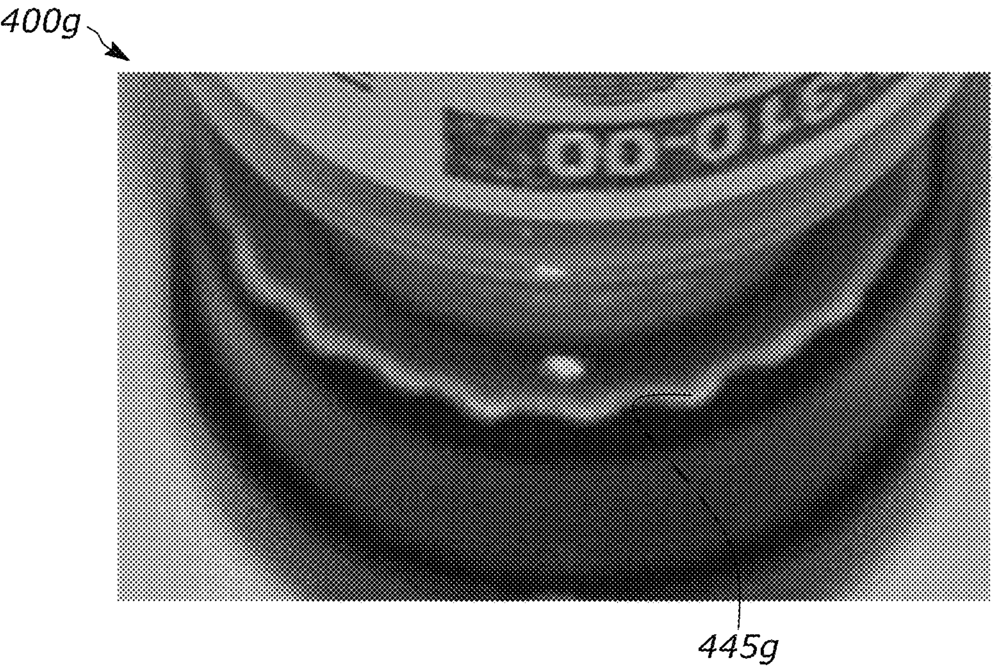
FIG. 4G depicts an example vial seal having a rippled crimp portion.
Figure 4H:
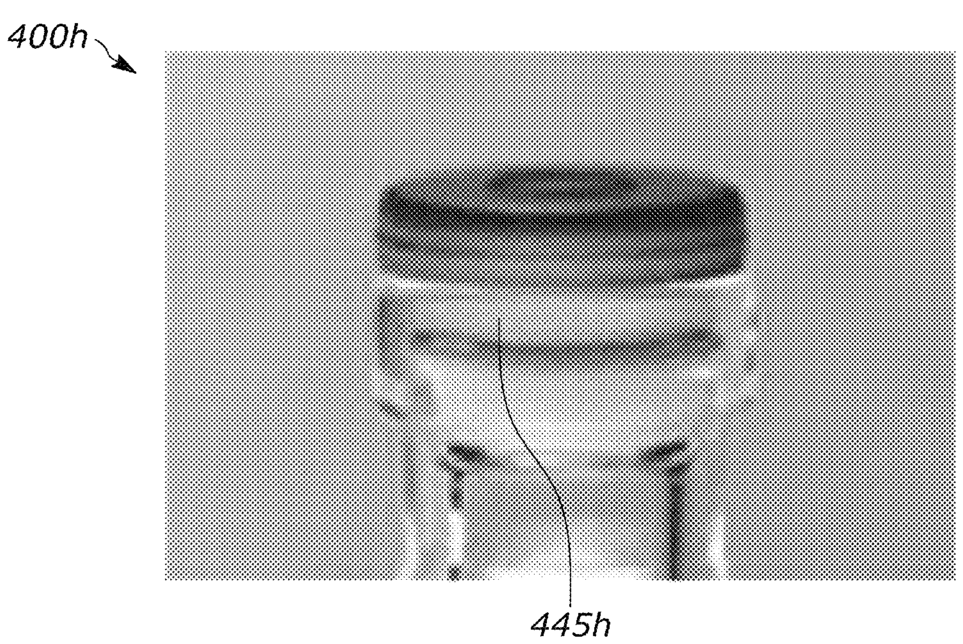
FIG. 4H depicts an example vial with no seal.

With reference to FIGS. 4A-H, a defective vial seal 400*a-h* may include at least one defect 445*a-h*. FIG. 4E depicts a misaligned crimp 445*e*. FIG. 4F depicts no crimp 445*f*. FIG. 4G depicts seal rippled 445*g* with an associated vial inverted and the view looking down on the defective vial seal 400*g*. FIG. 4H depicts a missing seal 445*h*.

Figure 5A:
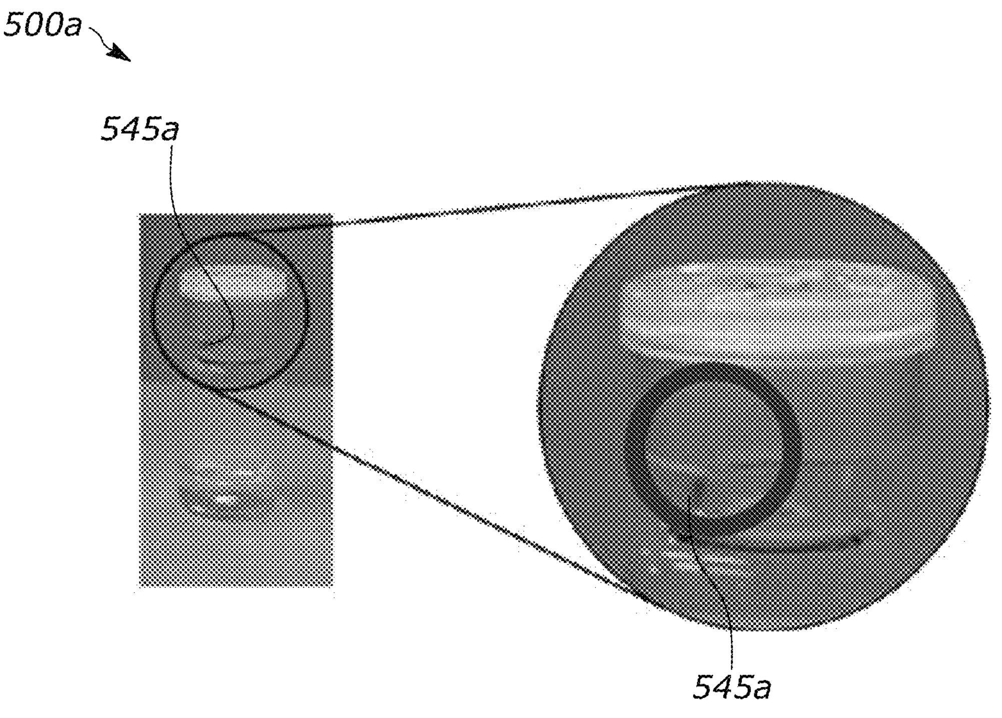
FIGS. 5A-C depict an example vial seal having a partial crimp portion.
Figure 5B:
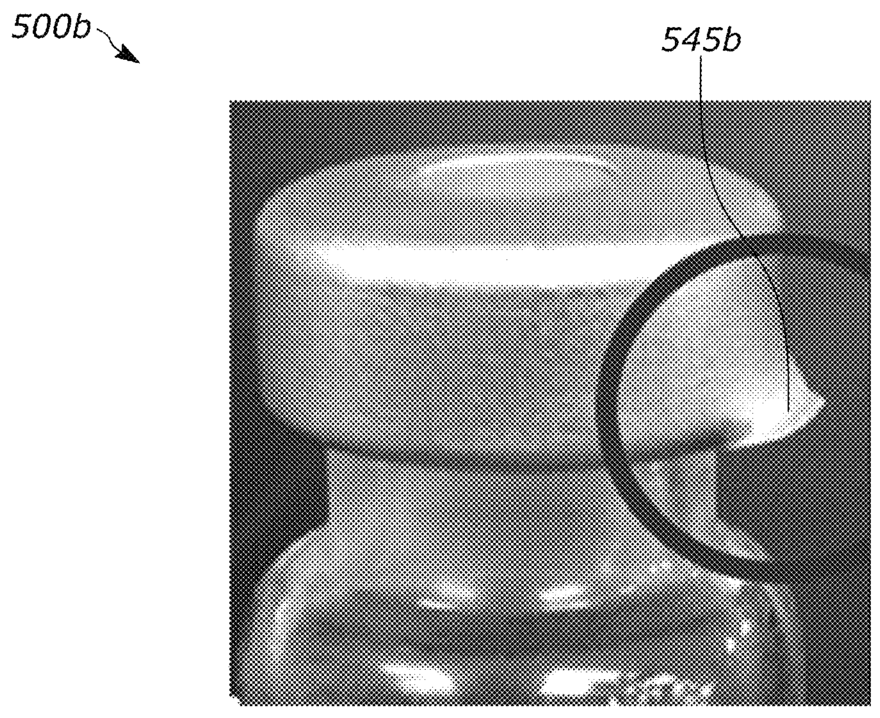
Figure 5C:
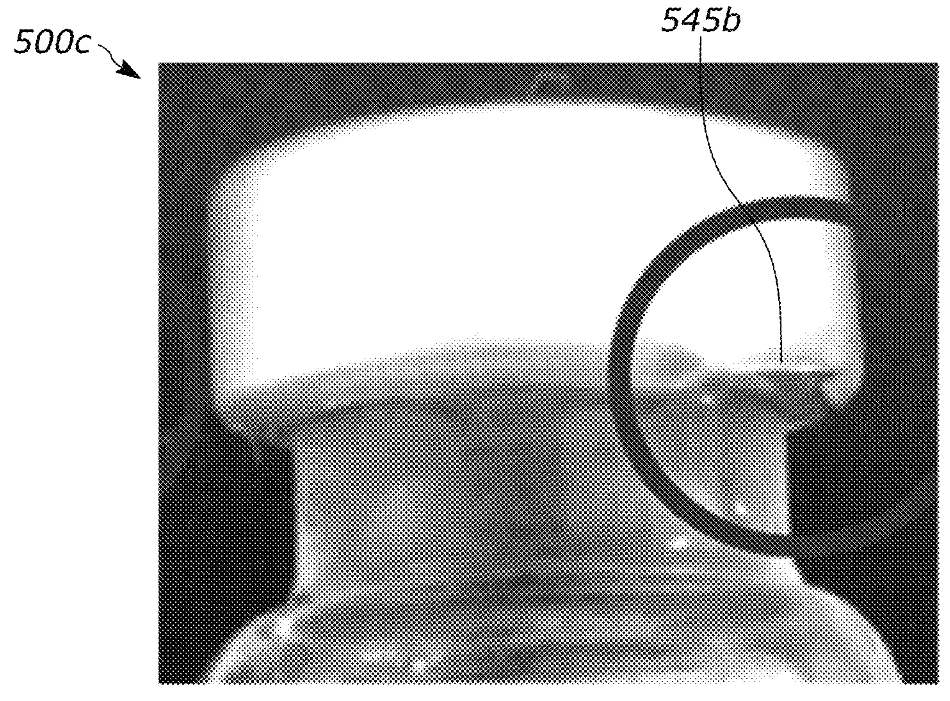

With reference to FIGS. 5A-C, a defective vial seal 500*a-c* may include a partial seal crimp 545*a-c*. As described in detail herein, the apparatuses, systems, and methods of the present disclosure may generate vial seal 3D data that is representative of at least a portion of a defective vial seal 400*a-h*, 500*a-c*.

Figure 6A:
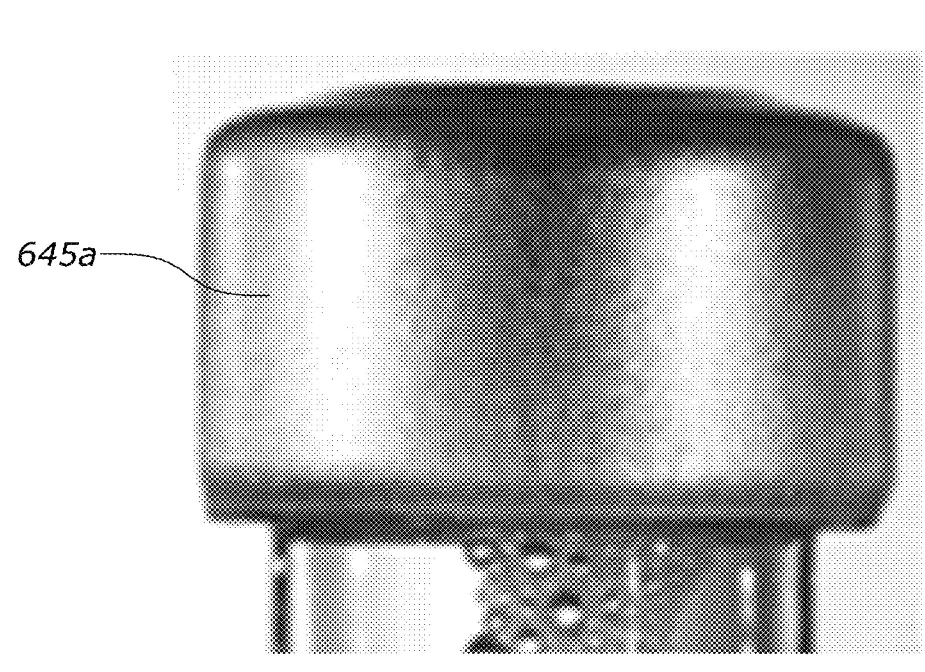
FIGS. 6A-F depict various example vial seals.
Figure 6B:
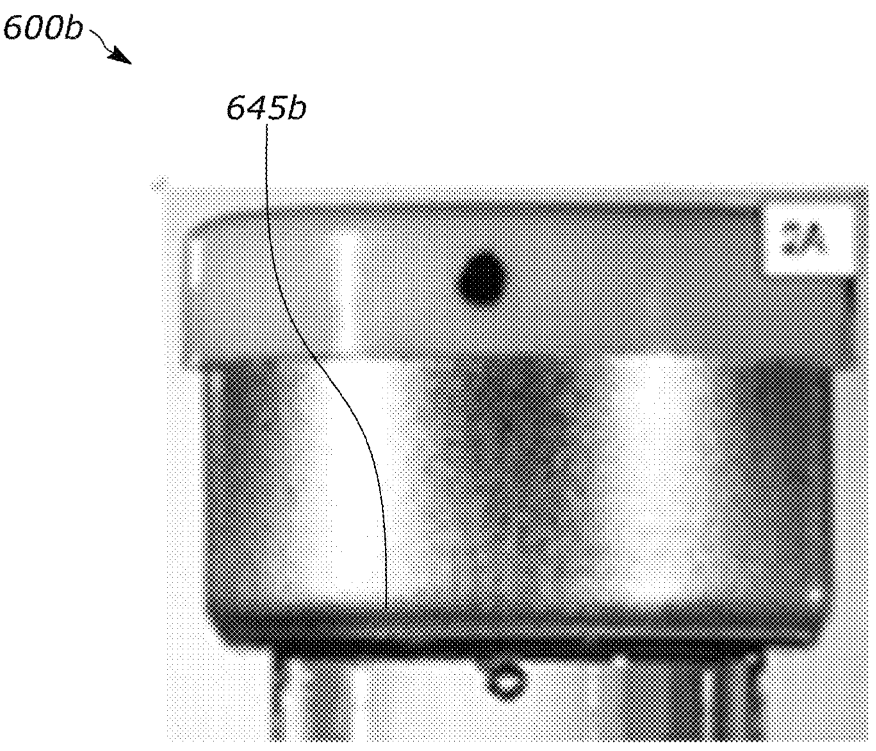
Figure 6C:
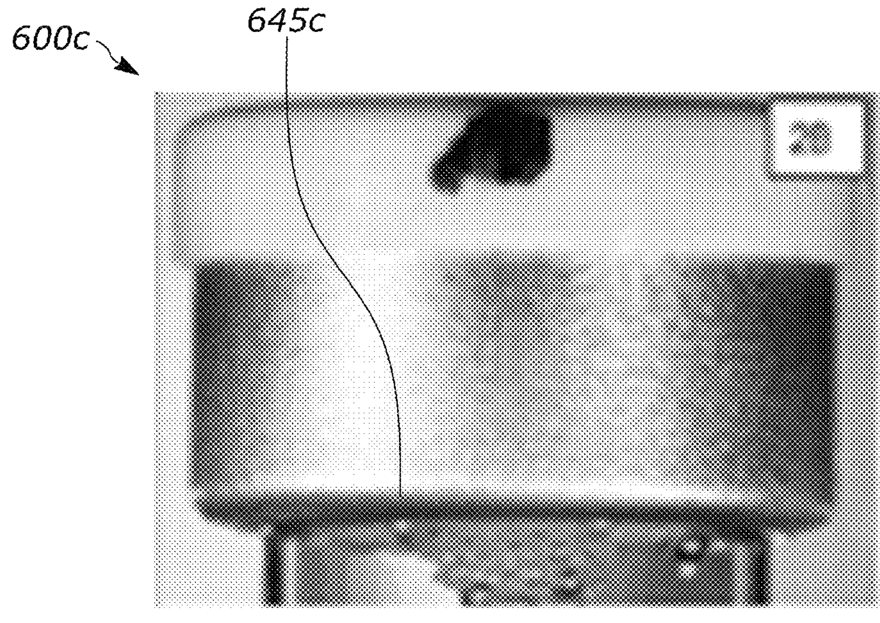
Figure 6D:
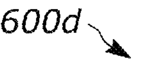
Figure 6D:
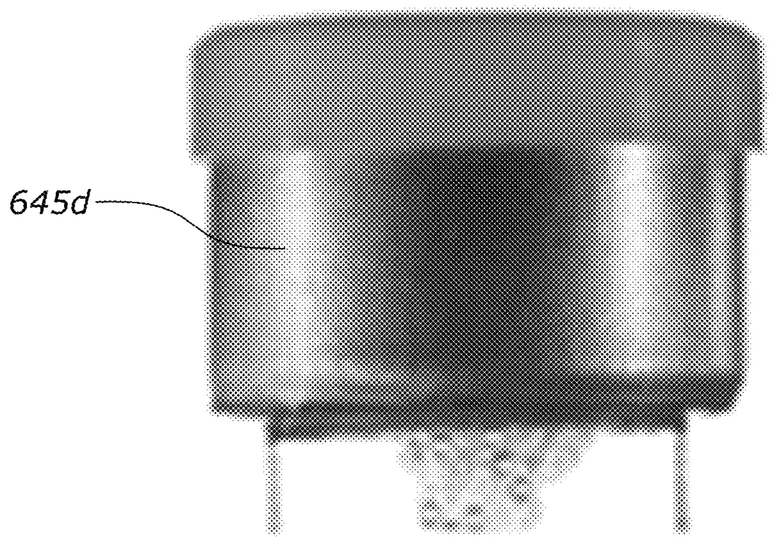
Figure 6E:
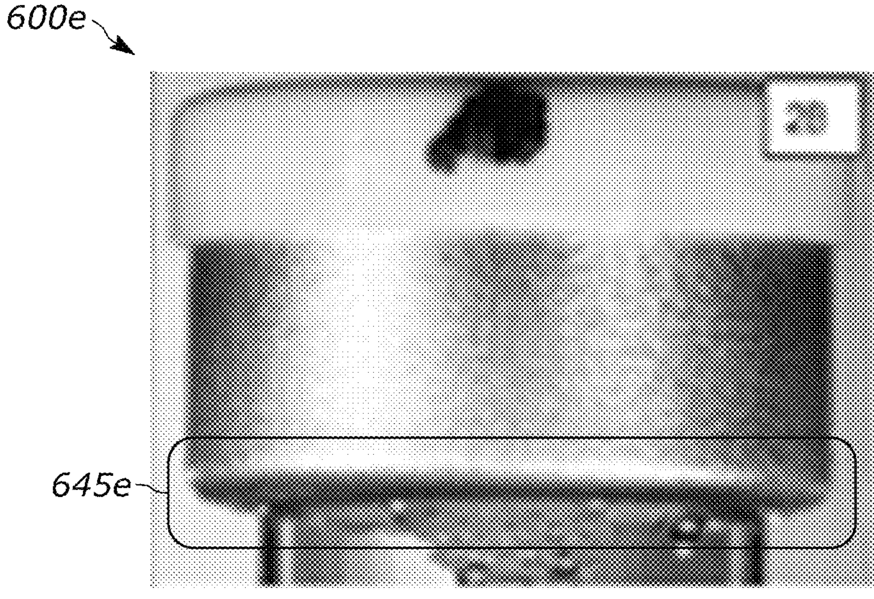
Figure 6F:
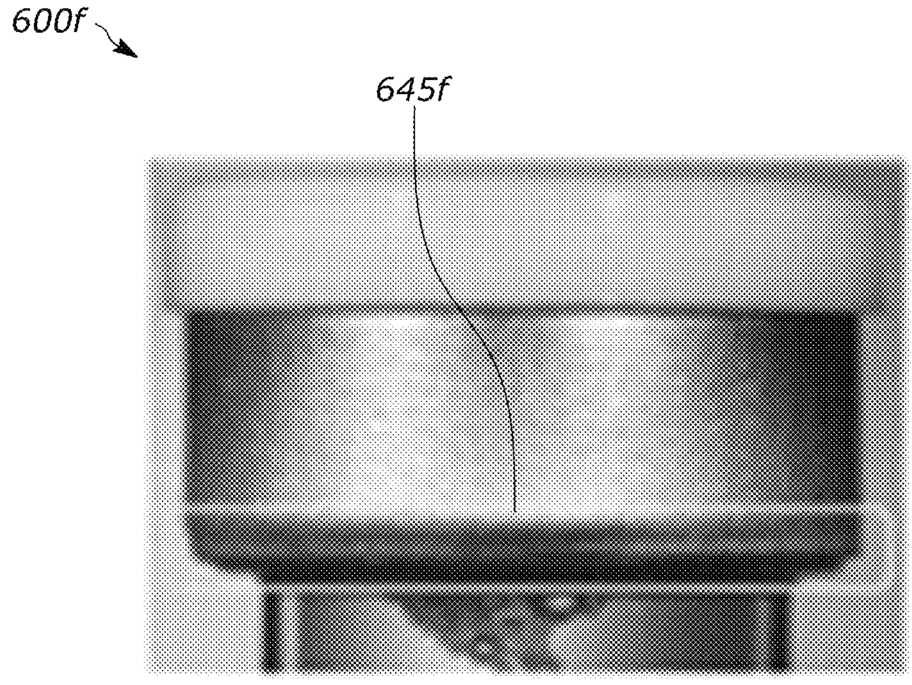

Turning to FIGS. 6A-F, a vial seal 600*a-f* having an at least partially crimp 645*a-f*. FIG. 6B depicts a vial seal 600*b* having a loose crimp 645*b*. FIG. 6C depicts a vial seal 600*c* having a non-defective crimp 645*c*. While a defective seal crimp does not necessarily affect the quality of the drug enclosed in the container, a vial seal 600*a-f* dropping off in front of a patient, for example, does not give confidence in a related product.

Figure 7:
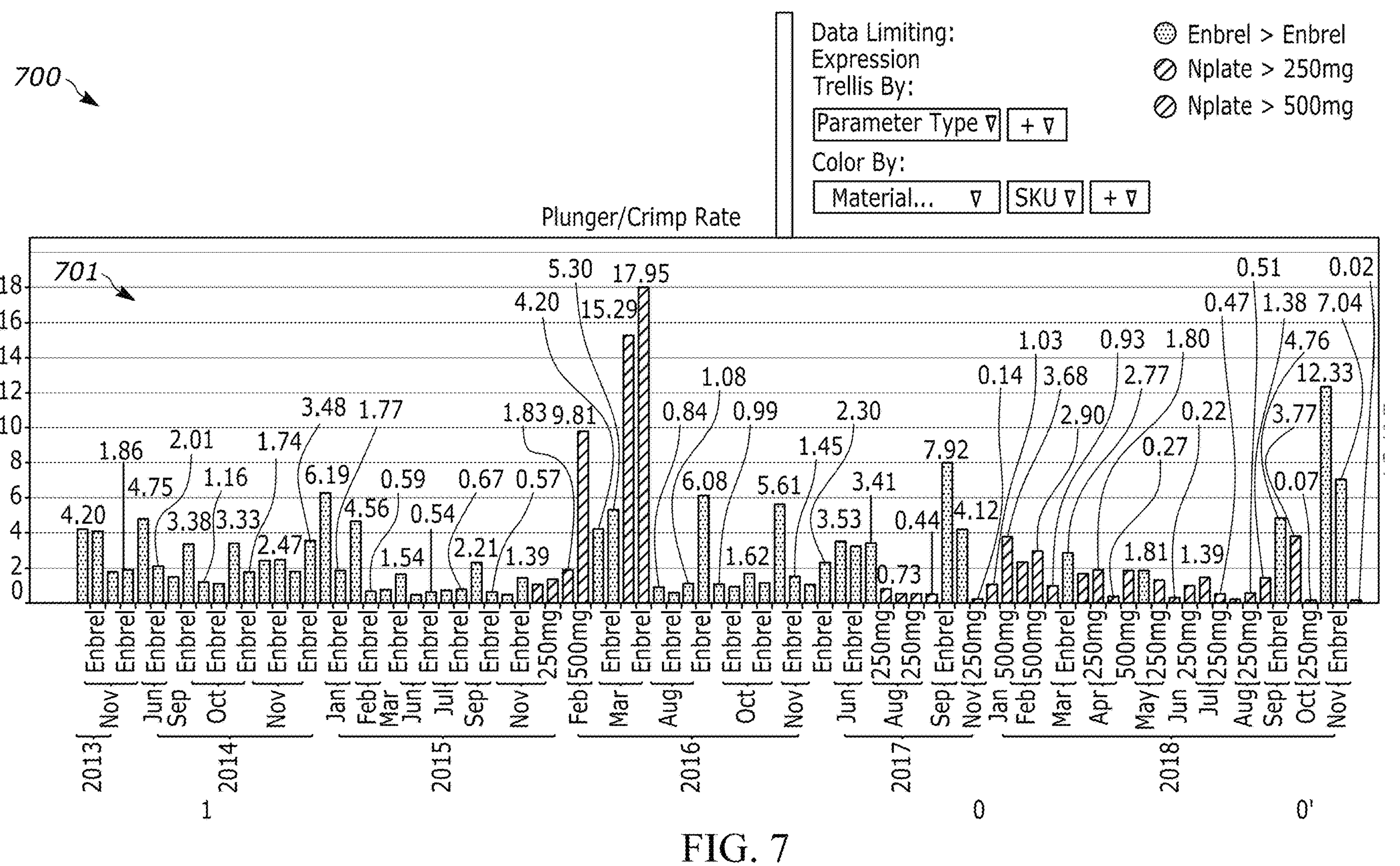
FIG. 7 depicts example vial seal inspection batch data showing vial seal fails using a two-dimension (2D) vial seal crimp inspection.

With reference to FIG. 7, vial batch data 700 may illustrate vial seal fails due to 2D crimp inspection. Associated vial inspection may not detect all real vial seal defects, and may mainly include false fails. The graph 701 illustrates vial seal inspections resulting from a traditional 2D camera inspection (i.e., no Z data like in the 3D laser crimp data). False fails included in graph 70*a* may be prone to illumination issues caused by vial seal batch variations. Graph 701 depicts that a vial seal reject rate as high as 17% has been seen using traditional 2D vial seal crimp inspection. The different grey scales of FIG. 7 may reflect different products, with vial seal crimp styles that may be similar.

Figure 8A:
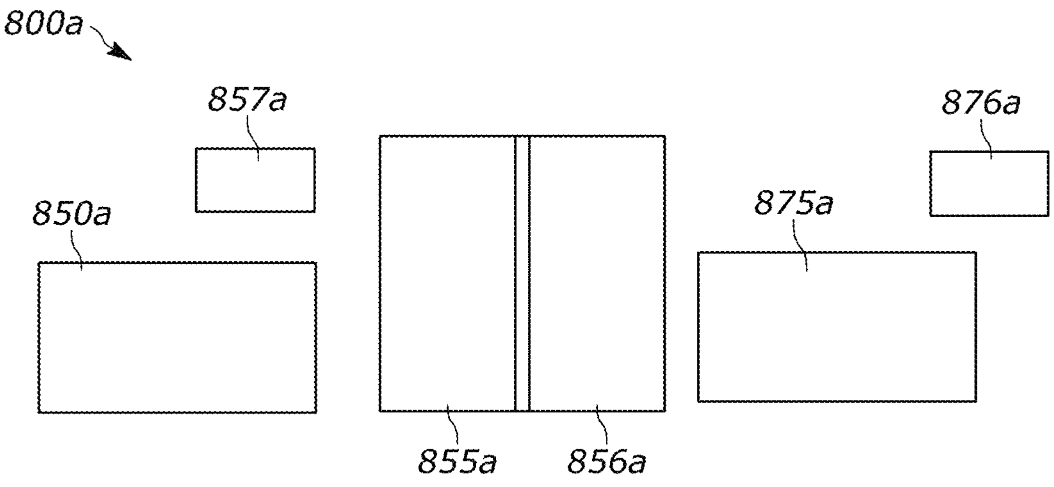
FIGS. 8A and 8B depict an example vial seal inspection system.
Figure 8B:
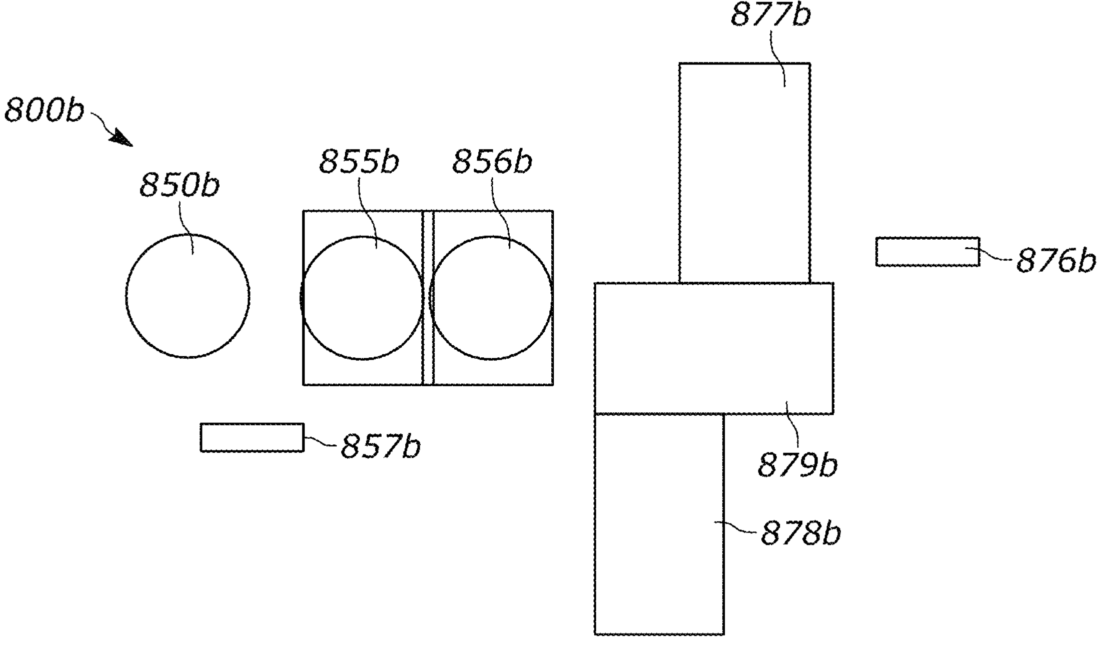

Turning to FIGS. 8A and 8B, a vial seal inspection system 800*a,b* may include a vial loading turret 850*a,b*, a first vial seal inspection device 855*a,b*, a second vial seal inspection device 856*a,b*, a first man-machine interface 857*a,b*, an inspected vial collection device 875*a*, and a second man-machine interface 876*a,b*. The first and second vial seal inspection devices 855*a,b*, 856*a,b* may be configured to provide, for example, two times the vial throughput as compared to a single vial seal inspection devices. The inspected vial collection device 875*a* may include accepted vial trays 877*b*, a vial ejection conveyor 878*a*, and a plurality of vial rejection bins 879*b*. The 3d Laser heads are installed on the main turrets and from a speed and operational point of view they can be considered as camera stations but with extra data in the Z axis which gives the 3D result.

Figure 9A:
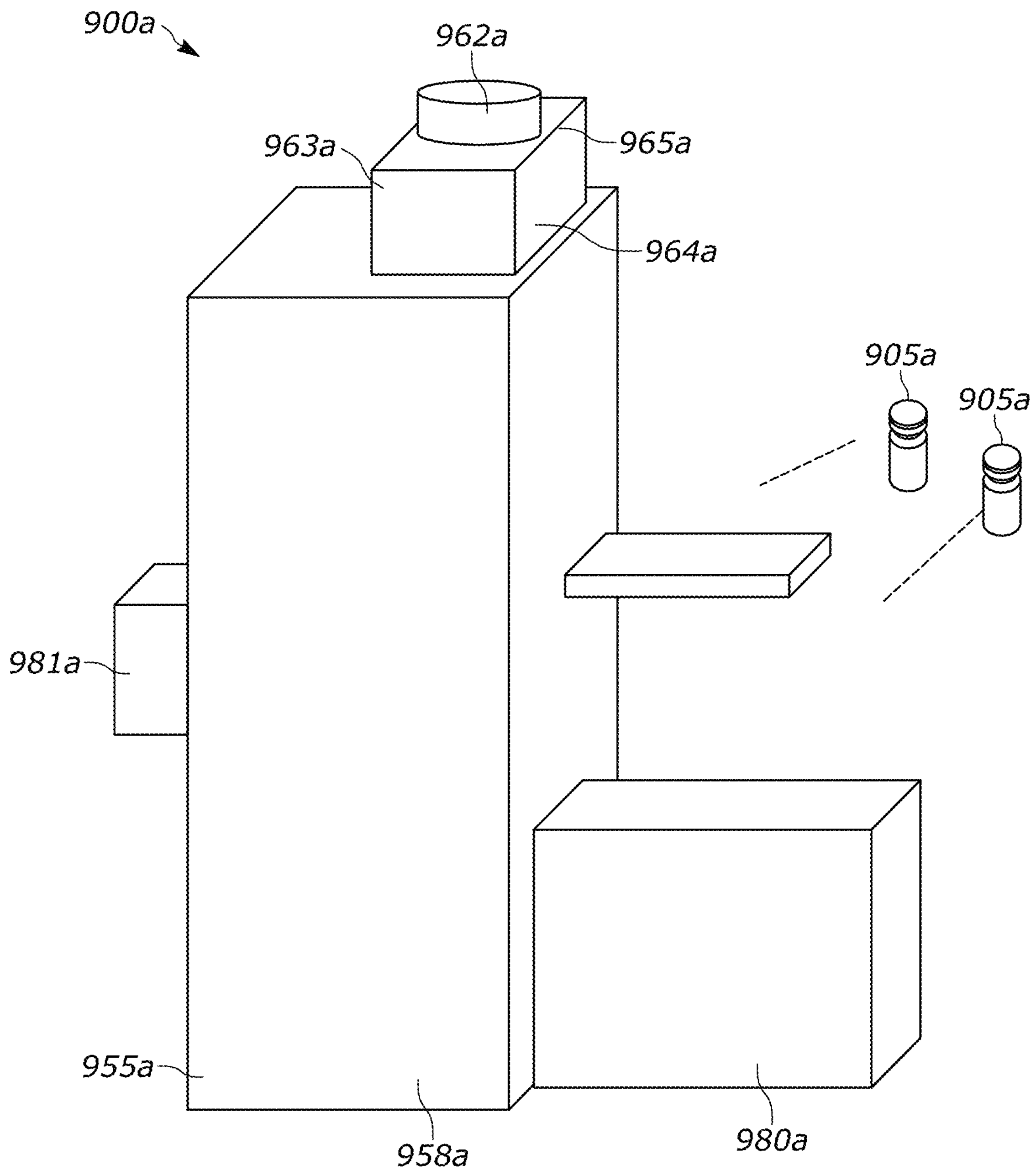
FIGS. 9A-C depict an example automatic visual inspection (AVI) apparatus having two laser triangulation sensors.
Figure 9B:
Figure 9B:
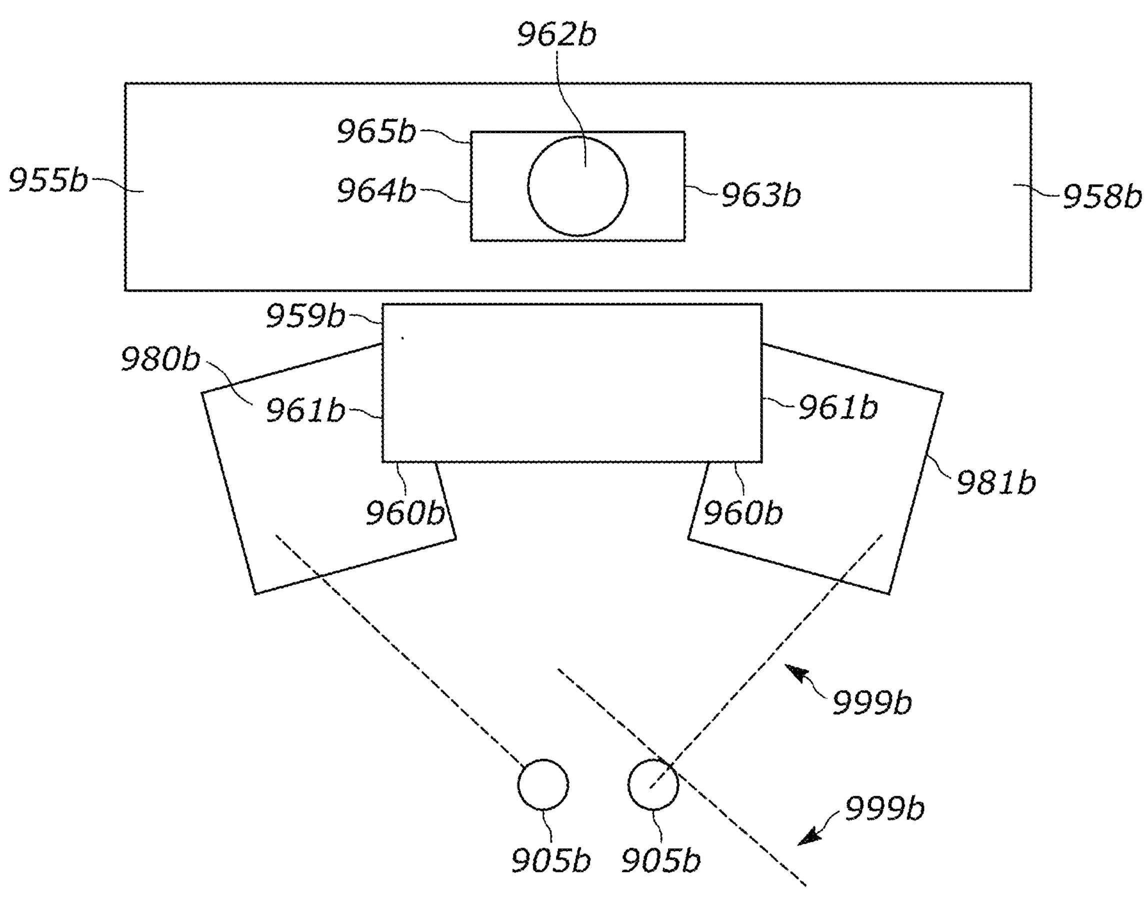
Figure 9C:
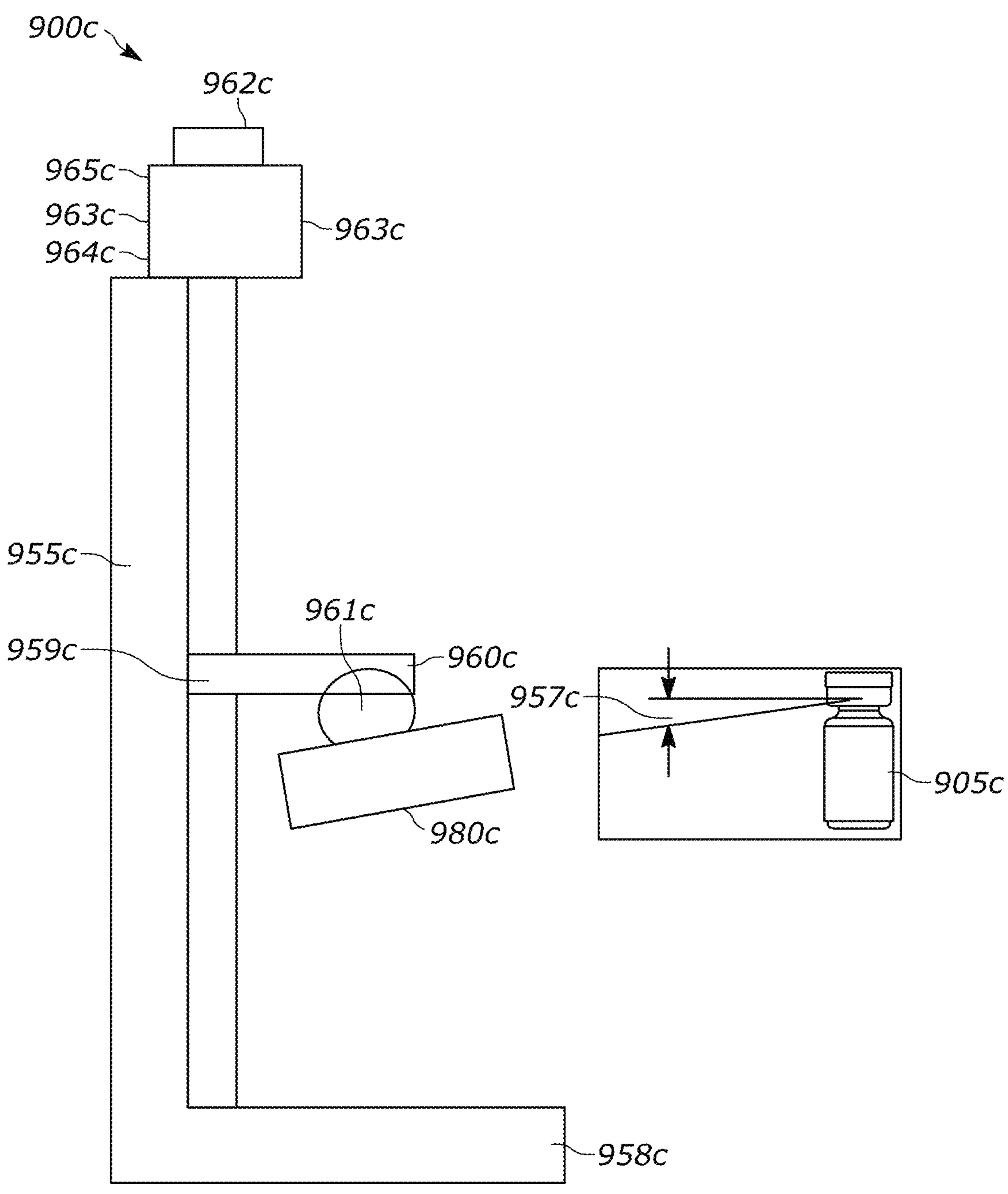

With reference to FIGS. 9A-C, a vial seal inspection system 900*a-c* may include at least one vial seal inspection device 955*a-c* having a controller 962*a-c* with a remote device connection 963*a-c*, a user input 964*a-c* and a display 965*a-c*. A vial seal inspection device 955*a-c* may include a mounting base 958*a-c*, an adjustable height support 959*a-c* having a pivotally connected vial seal distance data generation sensor bracket 960*a-c*. A vial seal distance data generation sensor perpendicular angle 957*c* may be indicated with angle gage 961*b,c*. The vial seal distance data generation sensor perpendicular angle 957*c*, 961*b,c* may be representative of an angle between a vial central axis 104 and a line that extends from a vial seal distance data generation sensor near alarm distance point 1091*a,b* to a vial seal distance data generation sensor far alarm distance point 1092*a,b*. The vial seal distance data generation sensor angle 957*c*, 961*b,c* may be, for example, manually adjusted to include more of, or less of, either a vial seal periphery surface 116 or a vial seal crimp surface 119 in a "field of view" of an associated vial seal distance data generation device 980*a-c*, 981*a,b*. The vial seal distance data generation sensor angle 957*c*, 961*b,c* may be adjusted to, for example, scan a curved surface 323 of a vial seal crimp which goes under a lip 107 and an upper portion of the vial seal.

A vial seal distance data generation device 980*a-c*, 981*a,b* may be configured with an exposure time that is based on a vial seal surface 116, 118, 119 color and/or texture. Details of the exposure times are provided herein with reference to Table 1.

A vial seal distance data generation device incident angle 999*a,b* may be, for example, representative of an angle between a light emitter central axis 1082*a,b* and a line that is tangent to a line extending around a periphery surface 116.

As described in detail herein, a vial seal distance data generation device incident angle 999*a,b* may be based on, for example, a color of a surface 116, 119, a texture of a surface 116, 119, a refractive index associated with a coating on surface 116, 119, etc.

The vial seal inspection device 955*a-c* may include a first vial seal distance data generation device 980*a-c* configured to generated vial seal distance data representative of at least a portion of a vial seal of a first vial 905*b*, a second vial seal distance data generation device 981*a,b* configured to generated vial seal distance data representative of at least a portion of a vial seal of a second vial 905*b*. Each vial seal distance data generation devices 980*a-c*, 981*a,b* may include, for example, a respective laser triangulation device (e.g., laser triangulation device 1000*a,b* of FIGS. 10A and 10B, etc.). Each vial seal distance data generation device 980*a-c*, 981*a,b* may include a vial seal distance data generation device input connection 983*c* and a vial seal distance data generation device output connection 984*c*.

Two vial seal distance data generation devices 980*a-c*, 981*a,b* may be configured to, for example, provide dual vial seal inspection (e.g., 400 vials per minute, etc.). The user interface 964*a-c* may include three buttons configured to, for example, indicate a height (e.g., standoff height 1089*a,b* of FIGS. 10A and 10B, etc.) of an associated vial seal distance data generation device 980*a-c*, 981*a,b* with respect to, for example, a vial seal crimp 119; this may result in an accurate measurement range 1090*a,b*. A measurement range 1090*a,b* may be different for different vial seals 115 (e.g., smaller vial seals, larger vial seals, etc.) and/or different vials 105 (e.g., a smaller vial, a larger vial, etc.). Additionally, the vial seal inspection device 955*a-c* may be configured with fail safe height thresholds (i.e., if the height 1082*a,b* is not right for a particular vial being inspected, the vial seal inspection device 955*a-c* may provide an alert or a device stop, etc.).

During a vial seal inspection the vial seal inspection sensors 980*a-c*, 981*c* may, for example, not move relative to a vial being inspected (i.e., the vial may rotate relative the vial seal inspection sensors 980*a-c*, 981*c*, etc.). For example, internal optics of a vial seal inspection sensors 980*a-c* may scan a full surface of a vial seal crimp surface 119 and at least a portion of a vial seal periphery surface 116. Scanning of a vial seal may be internal to the vial seal inspection sensors 980*a-c*, 981*c*. A pre-determined Z-axis "zero" value may be set for height 1082*a,b* by, for example, manually turning a knob on the vial seal inspection sensors 980*a-c*, 981*c*. A vial seal inspection sensor 980*a-c*, 981*c* may be fixed at a particular location for a full vial seal inspection batch. Alternatively, or additionally, a Z-axis "zero" value may be automatically and/or dynamically for height 1082*a,b* based on, for example, a feedback signal of an associated zero height sensor.

A standoff height 1089*a,b* may be set once at a start of a batch by a setup technician. This height may be correlated with, for example, a vial stock-keeping unit (SKU). When the turret of the main AVI system rotates two new vials enter the inspection area. The head is stationary at this point and the vial rotates at a preset RPM to enable a predetermined number of scans to be achieved over a desired vial seal perimeter (e.g., 360 degrees, etc.). A vial seal rotation speed and/or a number of vial seal scans per rotation may be based on, for example, a vial inspection rate (i.e., vials inspected per second), an acceptable Z-axis distance tolerance, a desired resolution of associated vial seal 3D data, etc.

Figure 10A:
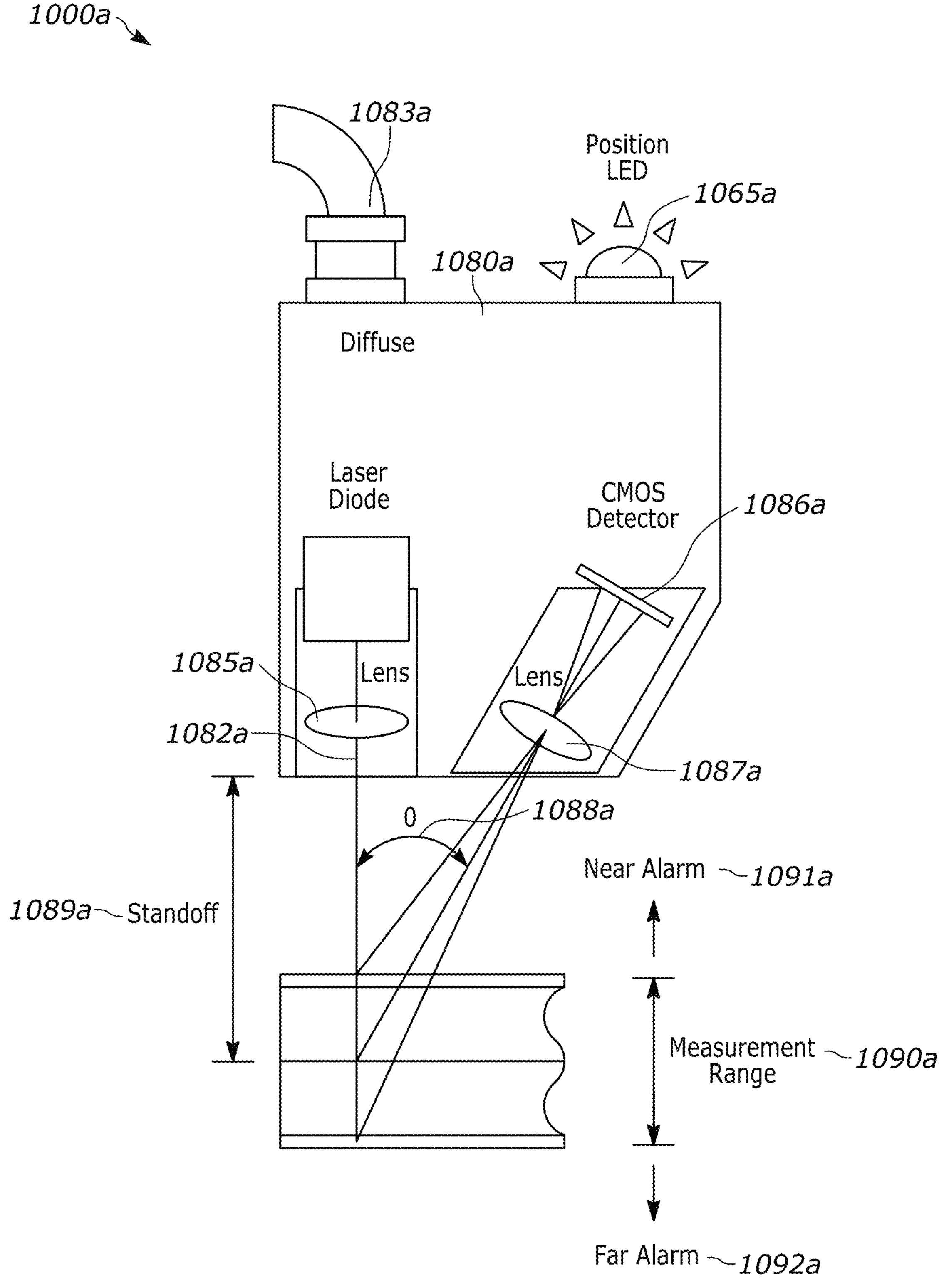
FIGS. 10A and 10B depict example laser triangulation sensors.
Figure 10B:
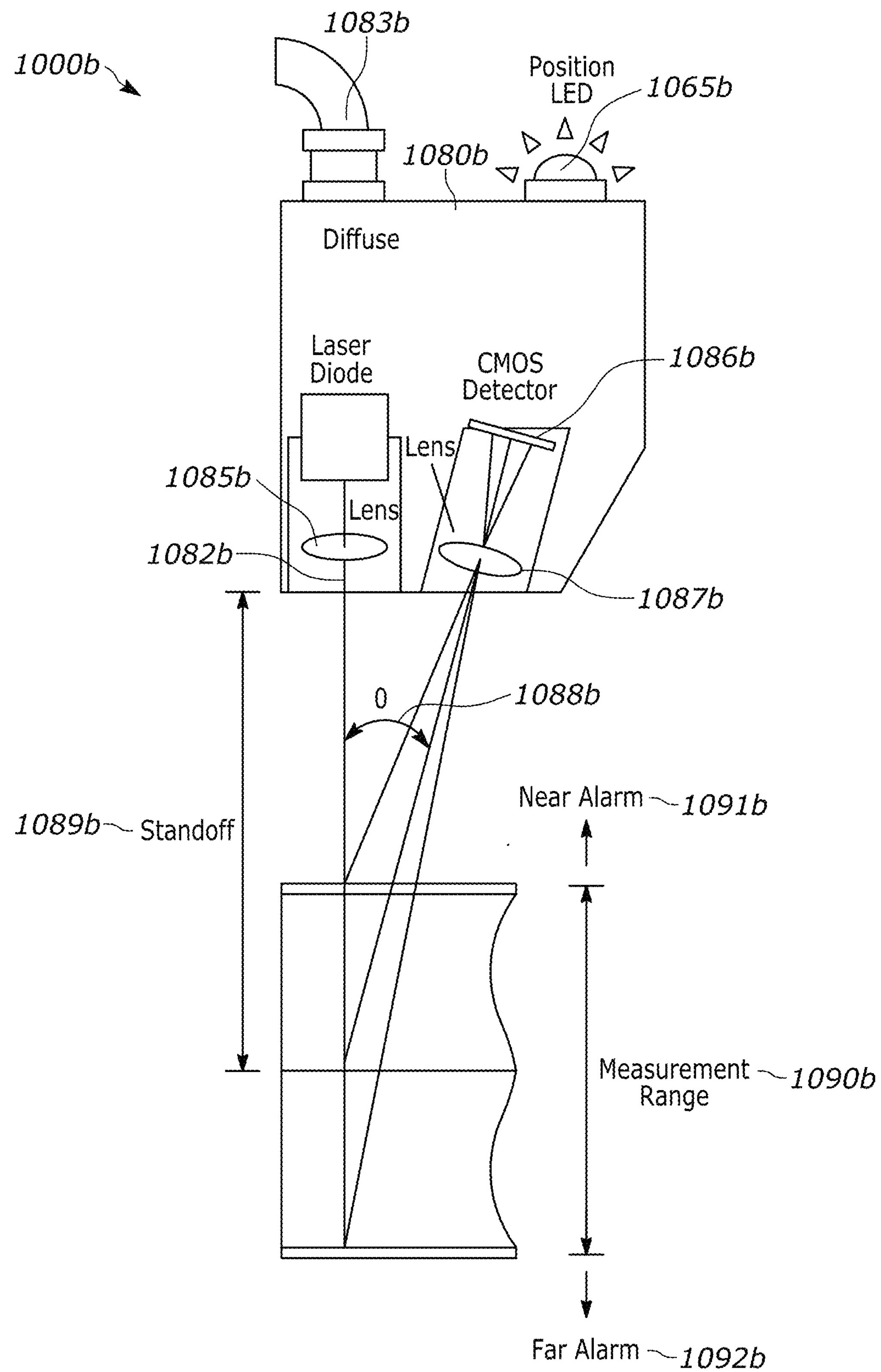

Turning to FIGS. 10A and 10B, a vial seal distance data generation device 1000*a,b* (e.g., a laser triangulation sensor, a Micro-Epsilon LLT2657-50 laser triangulation sensor as available from scancontrol, etc.) may include a housing 1080*a,b*, an input/output connection 1083*a,b*, an output 1065*a,b* (alternatively, or additionally an output connection 984*c*), a light source central axis 1082*a,b*, light source optics 1085*a,b*, a light sensor 1086*a,b*, light sensor optics 1087*a,b*, a scan line angle 1088*a,b*, a standoff height 1089*a,b*, a measurement range 1090*a,b*, a near alarm 1091*a,b*, and a far alarm 1092*a,b*. The vial seal distance data generation device 1000*a,b* may be configure to output, for example, a vial seal distance data that is representative of Y-data values correlated with Z-axis data.

Figure 11A:
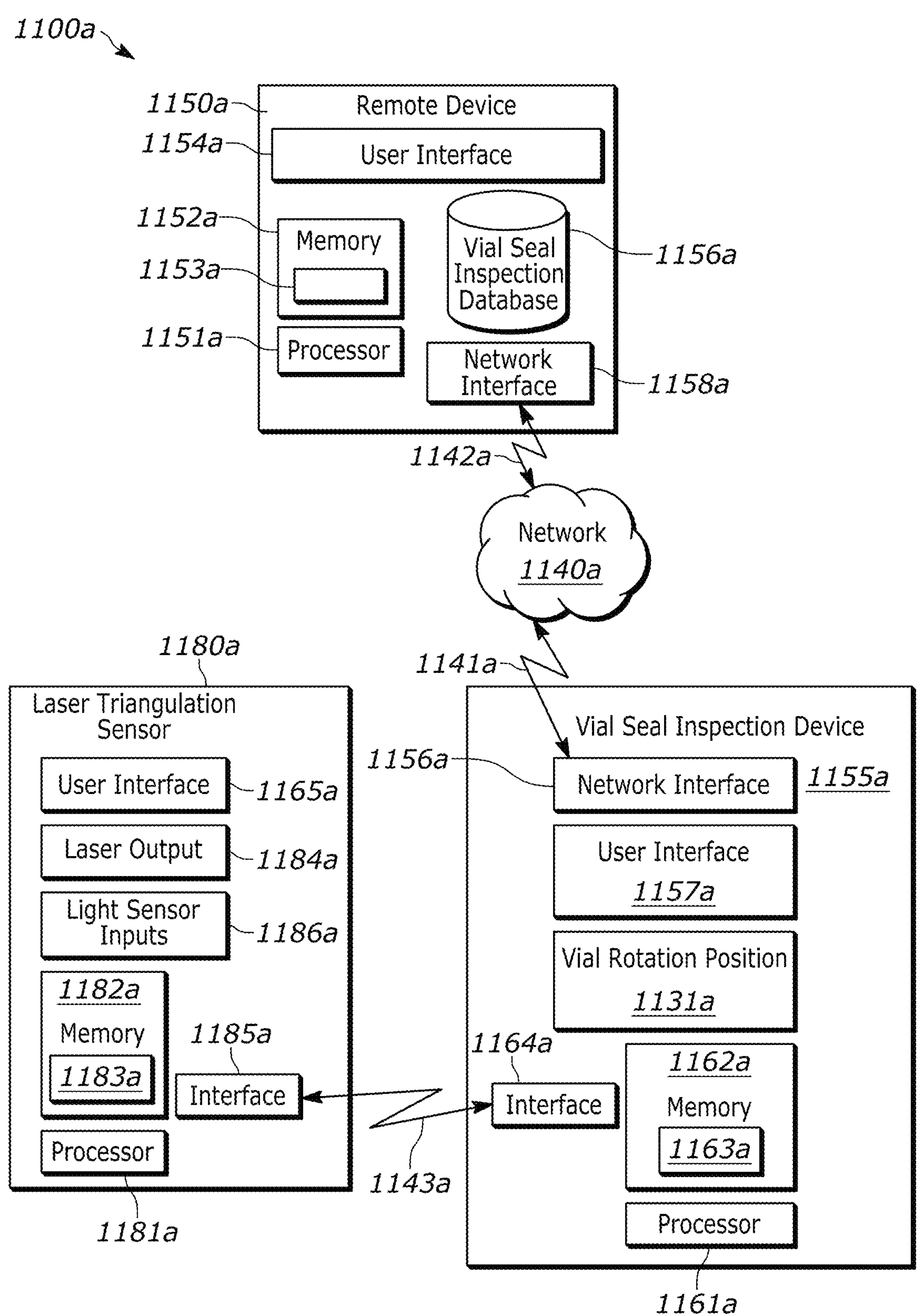
FIG. 11A depicts a high-level block diagram of an example vial seal inspection system.

While not shown in FIGS. 10A and 10B, a vial seal distance data generation device 1000*a,b* may also include a memory (e.g., memory 1182*a* of FIG. 11A) and/or a processor (e.g., processor 1181*a* of FIG. 11A). A vial seal distance data generation device 1000*a,b* with memory 1182*a* and processor 1181*a* may be configured to process Y-axis data and Z-axis data, and subsequently provide processed Y-axis data and/or processed Z-axis data to a vial seal distance data generation device controller 962*a-c*. The vial seal distance data generation device 1000*a,b* may be configure to output, for example, a binary indication of whether a given vial seal is acceptable or not. Alternatively, or additionally, the vial seal distance data generation device 1000*a,b* may be configure to output, for example, a continuous range of values indicative of a probability (a likelihood) of whether a given vial seal is acceptable (e.g., 0-100%, greater than zero percent and less than one-hundred percent, etc.).

With two vial seal distance data generation devices 1000*a,b*, an associated vial seal inspection system 800*a,b* may be configured to inspect vial sizes of, for example, 4 cc and 5 cc at speeds of 400 vials per min, 20 cc and 30 cc at speeds of 333 vials per minute, and 50 cc at approx. 200 vials per minute. A scan speed may be based on a respective resolution.

A laser beam 1082*a,b* may be projected on vial seal being measured 115, and a portion of the laser beam may be reflected through optics onto a detector 1086*a,b*. As a distance (i.e., a Z-axis distance) from the vial seal distance data generation devices 1000*a,b* to the vial seal 115 changes, the laser beam 1082*a,b* proportionally moves on the detector 1086*a,b* focusing the beam and calculating a relative distance to the vial seal correlated with respective Y-axis data.

A number of scans per time period may be pre-determined. A vial seal distance data generation device 1000*a,b* specification may include a scan rate. To achieve one scan, a laser may send out a laser beam 1082*a,b* over a one scan vertical (Y-axis) area. The a vial seal distance data generation device 1000*a,b* may then wait for the laser light to return to the light sensor 1086*a,b*. The a vial seal distance data generation device 1000*a,b* may the perform calculations (e.g., triangulation calculations, etc.) on depth (Z-axis). Light emission, light sensing, and distance calculations may occur at the speed of light. A vial seal distance data generation device 1000*a,b* may be selected for a vial seal surface 116 color (e.g., a gray vial seal surface 116, a blue vial seal surface 116, etc.).

With reference to FIG. 11A, a vial seal inspection system 1100*a* may include a vial seal inspection device 1155*a* having at least one vial seal distance data generation device 1180*a* (e.g., a laser triangulation sensor, a sonic sensor, etc.), and a remote device 1150*a* communicatively interconnected via a network 1140*a*. The vial seal inspection system 1100*a* may be similar to, for example, the vial seal inspection system 800*a,b* of FIGS. 8A and 8B. The vial seal distance data generation device 1180*a* may be similar to, for example, the vial seal distance data generation sensor 1000*a,b* of FIG. 10 or the vial seal distance data generation device 900*a-c*. The remote device 1150*a* may be similar to, for example, either one of the man-machine interfaces 857*a,b* or 876*a,b* of FIGS. 8A and 8B.

For clarity, only one vial seal inspection device 1155*a*, one vial seal distance data generation device 1180*a*, and one remote device 1150*a* are depicted in FIG. 11A. While FIG. 11A depicts only one vial seal inspection device 1155*a*, one vial seal distance data generation device 1180*a*, and one remote device 1150*a*, it should be understood that any number of vial seal inspection devices 1155*a*, vial seal distance data generation devices 1180*a*, and remote devices 1150*a* may be supported by the vial seal inspection system 1100*a*.

A vial seal inspection device 1155*a* may include a memory 1162*a* and a processor 1161*a* for storing and executing, respectively, a module 1163*a*. The module 1163*a*, stored in the memory 1162*a* as a set of computer-readable instructions, may be related to an application for implementing at least a portion of the vial seal inspection system 1100*a*. As described in detail herein, the processor 1161*a* may execute the module 1163*a* to, among other things, cause the processor 1161*a* to receive, generate, and/or transmit data (e.g., vial seal inspection sensor configuration data, vial seal inspection device configuration data, vial seal 3D data, etc.) with the remote device 1150*a*.

The vial seal inspection device 1155*a* may also include a user interface 1157*a* which may be any type of electronic display device, such as touch screen display, a liquid crystal display (LCD), a light emitting diode (LED) display, a plasma display, a cathode ray tube (CRT) display, or any other type of known or suitable electronic display along with a user input device. A user interface 1157*a* may exhibit a user interface display which may, for example, depict a user interface for implementation of at least a portion of the vial seal inspection system 1100*a*.

The vial seal inspection device 1155*a* may also include a vial rotation position input 1131*a*, a network interface 1156*a*, and an interface 1164*a* configured to, for example, communicate vial seal inspection sensor configuration data, vial seal distance data, vial seal 3D data, etc. with the vial seal distance data generation sensor 1180*a*. The network interface 1156*a* may be configured to, for example, facilitate communications, for example, between the vial seal inspection device 1155*a* and the network device 1140*a* via any wireless communication network 1141*a*, including for example: a wireless LAN, MAN or WAN, WiFi, TLS v1.2 WiFi, the Internet, or any combination thereof. Moreover, a stationary telepresence device 205*a* may be communicatively connected to any other device via any suitable communication system, such as via any publicly available or privately owned communication network, including those that use wireless communication structures, such as wireless communication networks, including for example, wireless LANs and WANs, satellite and cellular telephone communication systems, etc.

A vial seal distance data generation device 1180*a* may be similar to, for example, vial seal distance data generation sensor 1000*a,b* of FIGS. 10A and 10B. As described with reference to FIGS. 10A and 10B, a vial seal distance data generation device 1180*a* may include a memory 1182*a* and a processor 1181*a* for storing and executing, respectively, a module 1183*a*. The module 1183*a*, stored in the memory 1182*a* as a set of computer-readable instructions, may be related to an application for implementing at least a portion of the vial seal inspection system 1100*a*. As described in detail herein, the processor 1181*a* may execute the module 1183*a* to, among other things, cause the processor 1181*a* to receive, generate, and/or transmit data (e.g., camera control data, mobile base control data, video data, etc.) with the vial seal inspection device 1155*a* and/or directly with a remote device 1150*a*.

The vial seal distance data generation device 1180*a* may also include a user interface 1165*a* which may be any type of electronic display device, such as touch screen display, a liquid crystal display (LCD), a light emitting diode (LED) display, a plasma display, a cathode ray tube (CRT) display, or any other type of known or suitable electronic display along with a user input device. A user interface 1165*a* may exhibit a user interface display which may, for example, depict a user interface for implementation of at least a portion of the vial seal inspection system 1100*a*.

The vial seal distance data generation device 1180*a* may also include a light source output 1184*a*, a light sensor input 1186*a*, and an interface 1185*a* configured to, for example, communicate vial seal inspection sensor configuration data, vial seal distance data, vial seal 3D data, etc. with the vial seal inspection device 1155*a*. Moreover, a vial seal distance data generation device 1180*a* may be communicatively connected to any other device via any suitable communication system, such as via any publicly available or privately owned communication network, including those that use wireless communication structures, such as wireless communication networks, including for example, wireless LANs and WANs, satellite and cellular telephone communication systems, etc.

A remote device 1150*a* may include a memory 252*a* and a processor 251*a* for storing and executing, respectively, a module 253*a*. The module 253*a*, stored in the memory 1152*a* as a set of computer-readable instructions, may be related to an application for implementing at least a portion of the vial seal inspection system 1100*a*. As described in detail herein, the processor 1151*a* may execute the module 1153*a* to, among other things, cause the processor 1151*a* to receive, generate, and/or transmit data (e.g., vial seal distance data sensor configuration data, vial seal distance data device configuration data, vials seal inspection data, vial seal distance data, vial seal 3D data, etc.) with the network device 1140*a*.

The remote device 1150*a* may also include a user interface 1154*a* which may be any type of electronic display device, such as touch screen display, a liquid crystal display (LCD), a light emitting diode (LED) display, a plasma display, a cathode ray tube (CRT) display, or any other type of known or suitable electronic display along with a user input device. A user interface 1154*a* may exhibit a user interface display which may, for example, depict a user interface for implementation of at least a portion of the vial seal inspection system 1100*a*.

The remote device 1150*a* may also include a network interface 257*a* configured to facilitate communications (e.g., vial seal distance data sensor configuration data, vial seal distance data device configuration data, vials seal inspection data, vial seal distance data, vial seal 3D data, etc.), for example, between the remote device 1150*a* and the network device 1140*a* via any wireless communication network 1142*a*, including for example: TLS v1.2 REST API, TLS v1.2 Cellular, CSV/JSON Output, TLS v1.2 REST API, a wireless LAN, MAN or WAN, WiFi, TLS v1.2 WiFi, the Internet, or any combination thereof. Moreover, a remote device 1150*a* may be communicatively connected to any other device via any suitable communication system, such as via any publicly available or privately owned communication network, including those that use wireless communication structures, such as wireless communication networks, including for example, wireless LANs and WANs, satellite and cellular telephone communication systems, etc.

Figure 11B:
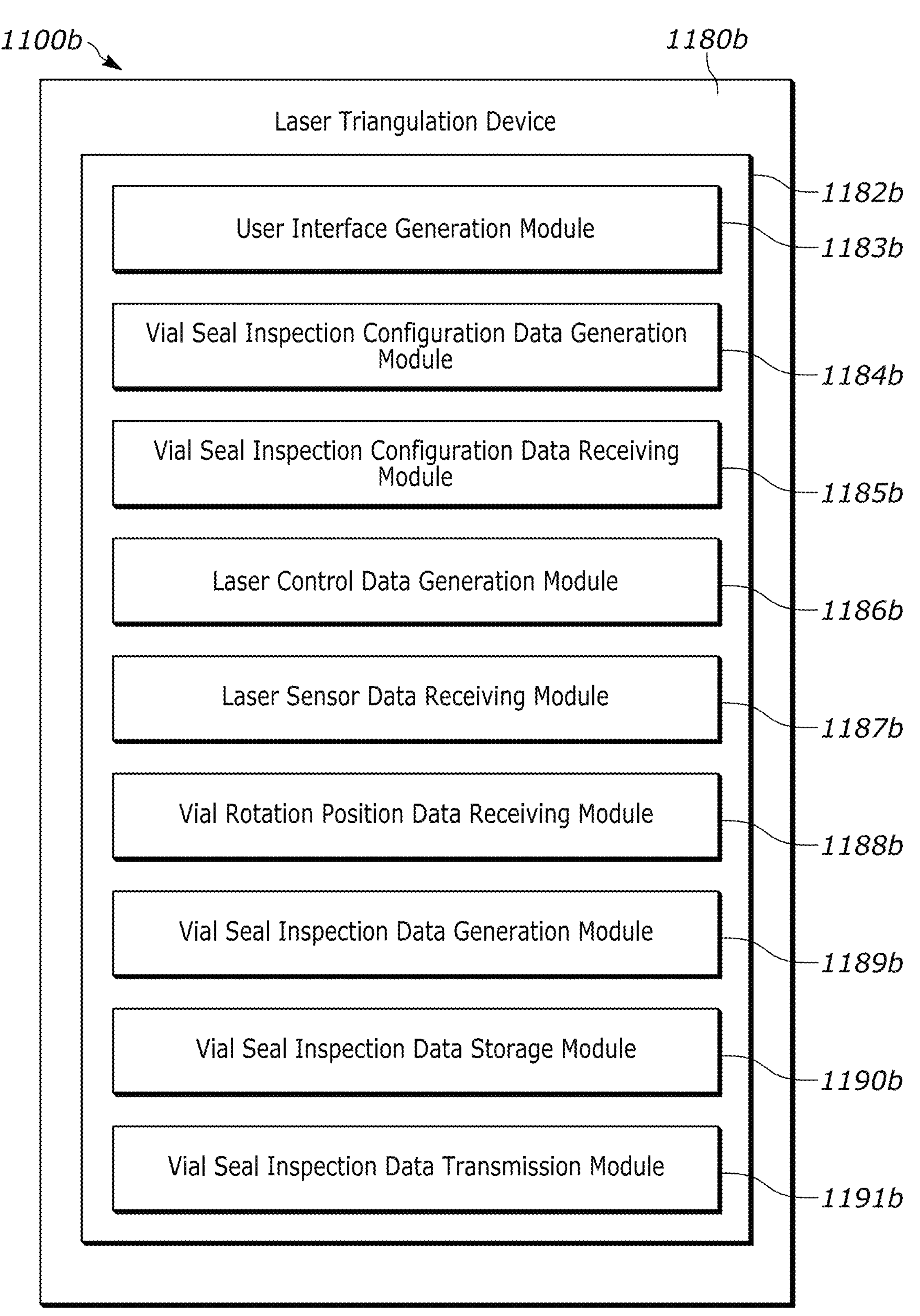
FIG. 11B depicts a block diagram of an example vial seal inspection sensor.

Turning to FIG. 11B, a vial seal inspection system 1100*b* may include a vial seal distance data generation device 1180*b* having a user interface generation module 1183*b*, a vial seal inspection configuration data generation module 1184*b*, a vial seal inspection configuration data receiving module 1185*b*, a laser control data generation module 1186*b*, a laser sensor data receiving module 1187*b*, a vial rotation position data receiving module 1188*b*, a vial seal inspection data generation module 1189*b*, a vial seal inspection data storage module 1190*b*, and a vial seal inspection data transmission module 1191*b*, for example, stored on a memory 1182*b* as a set of computer-readable instructions. In any event, the modules 1183*b*-1191*b* may be similar to, for example, the module 1183*a* of FIG. 11A.

Figure 11C:
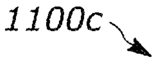
FIG. 11C depicts an example method for implementing a vial seal inspection sensor.
Figure 11C:
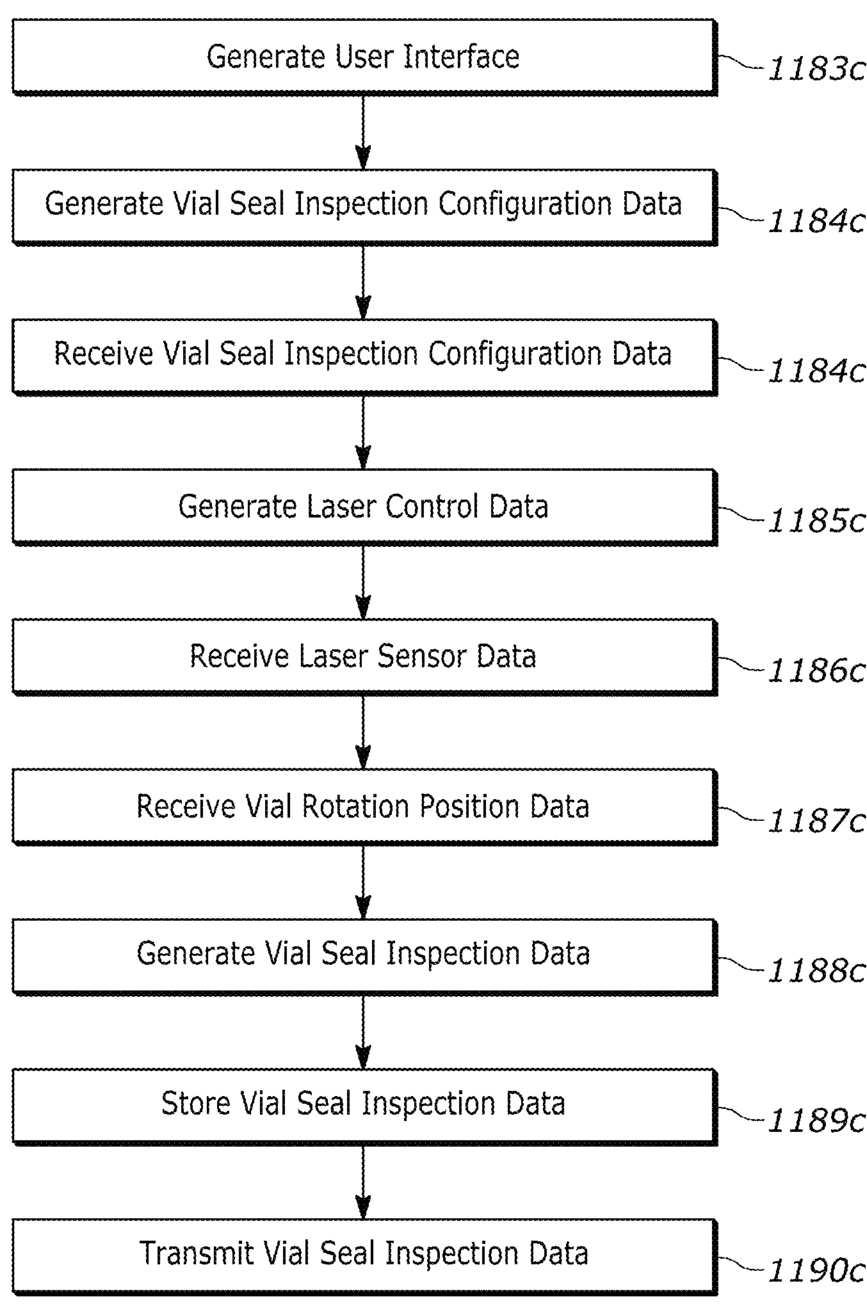

With reference to FIG. 11C, a method of implementing a vial seal distance data generation device 1100*c* may be implemented by a processor (e.g., processor 1181*a* of FIG. 11A) executing, for example, at least a portion of modules 1183*b*-1191*b* of FIG. 11B. In particular, processor 1181*a* may execute the user interface generation module 1183*b* to cause the processor 1181*a* to, for example, generate a user interface (block 1183*c*).

The processor 1181*a* may execute the vial seal inspection configuration data generation module 1184*b* to cause the processor 1181*a* to, for example, generate vial seal inspection configuration data (block 1184*c*). Vial seal inspection configuration data may include one or more of: a vial identification, a vial seal identification, a vial seal distance data generation device identification, a vial seal crimping system identification, a Z-axis tolerance threshold (e.g., a near alarm 1091*a,b*, a far alarm 1092*a,b*, etc.), an X-axis measurement range, a Y-axis measurement range, a Z-axis measurement range, a vial seal distance data generation sensor stand off-height, a vial seal distance data generation sensor exposure time, a vial seal distance data generation sensor scan rate, a vial seal distance data generation sensor incident angle, vial seal distance data generation sensor perpendicular angle, a vial rotation rate, vial physical dimensions, vial seal physical dimensions, a vial seal surface texture, a vial seal surface color, a vial seal surface coating thickness, a vial seal surface coating material, etc. The processor 1181*a* may execute the vial seal inspection configuration data receiving module 1185*b* to cause the processor 1181*a* to, for example, receive vial seal inspection configuration data (block 1185*c*).

The processor 1181*a* may execute the laser control data generation module 1186*b* to cause the processor 1181*a* to, for example, generate laser control data (block 1186*c*). For example, the processor 1181*a* may generate laser control data based on a vial seal distance data generation sensor exposure time, a vial seal distance data generation sensor scan rate, etc. The processor 1181*a* may execute the laser sensor data receiving module 1187*b* to cause the processor 1181*a* to, for example, receive laser sensor data (block 1187*c*). For example, the processor 1181*a* may receive laser sensor data from a light sensor 1186*a,b*.

The processor 1181*a* may execute the vial rotation position data receiving module 1188*b* to cause the processor 1181*a* to, for example, receive vial rotation data (block 1188*c*). The vial seal rotation position data (i.e., vial seal periphery data, X-axis data, etc.) may be, for example, pre-determined (e.g., vial seal periphery data may be based on a perimeter length of at least a portion of a vial seal, vial seal periphery data may be based on a vial rotation time, etc.), and may be manually entered via a user interface 1165*a*. Alternatively, or additionally, the vial seal rotation position data may be generated via, for example, a feedback sensor output. Feedback sensor output data (i.e., X-axis data) may be directly correlated with respective Y-axis data, and Z-axis data. More broadly, processor 1181*a* may generate vial seal 3D data based on correlating Y-axis data and Z-axis data, from a vial seal distance data generation sensor, with X-axis data, that may be representative of points along at least a portion of a perimeter of a vial seal.

The processor 1181*a* may execute the vial seal inspection data generation module 1189*b* to cause the processor 1181*a* to, for example, generate vial seal inspection data (block 1189*c*). The vial seal inspection data may be representative to, for example, Y-axis data, Z-axis data, vial seal 3D data, a vial seal acceptable, a vial seal reject, a probability that a vial seal is acceptable, a probability that a vial seal crimp is acceptable, etc. Additionally, or alternatively, the processor 1181*a* may generate vial seal inspection data based on a comparison of a current Z-axis value with a Z-axis tolerance threshold.

The processor 1181*a* may execute the vial seal inspection data storage module 1190*b* to cause the processor 1181*a* to, for example, store vial seal inspection data (block 1190*c*). The processor 1181*a* may execute the vial seal inspection data transmission module 1191*b* to cause the processor 1181*a* to, for example, transmit vial seal inspection data (block 1191*c*). For example, the processor 1181*a* may transmit vial seal inspection data to remote device 1150*a* and/or a vial seal inspection device 1155*a*.

Figure 11D:
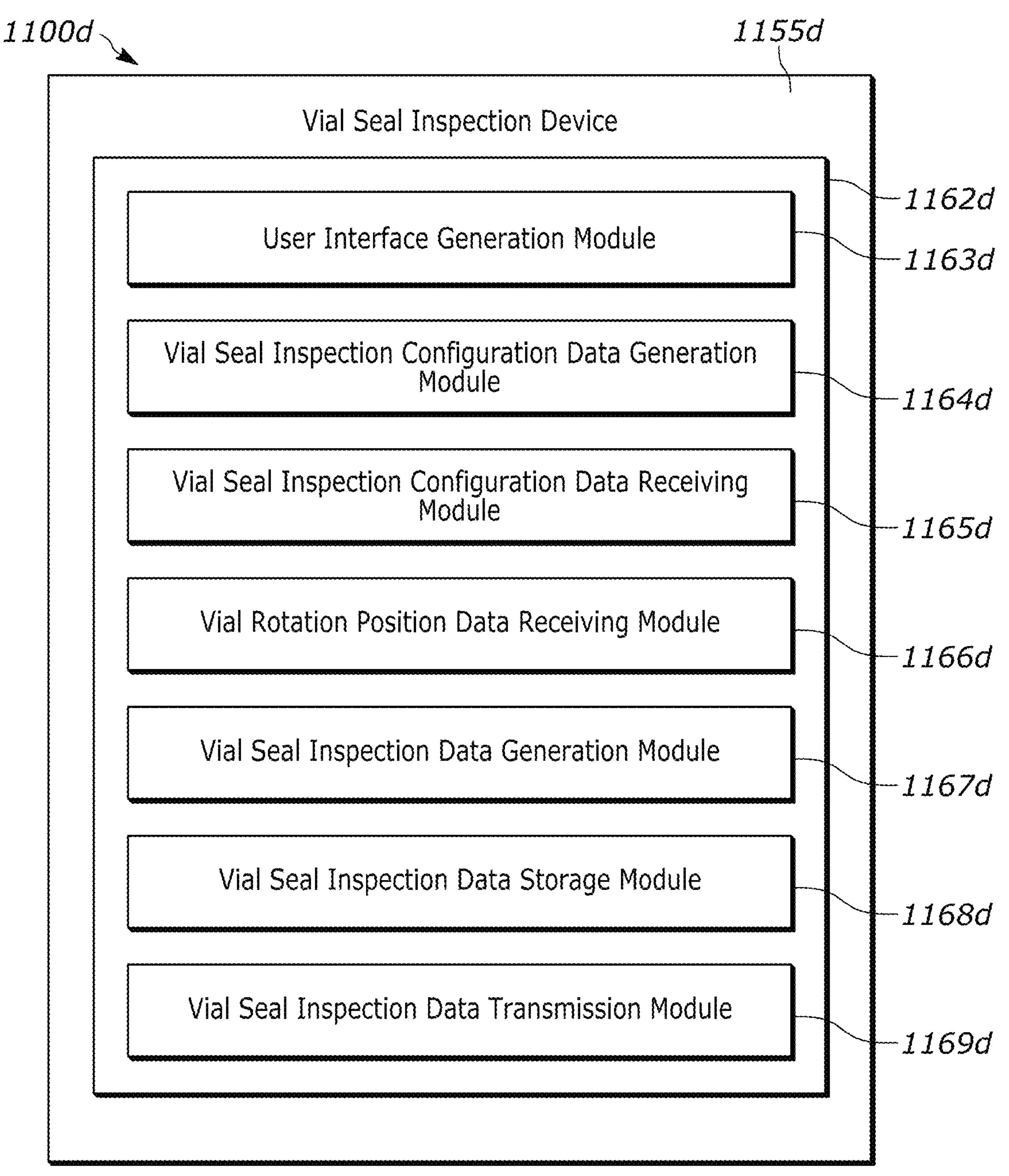
FIG. 11D depicts a block diagram of an example vial seal inspection device.

With reference to FIG. 11D, a vial seal inspection system 1100*d* may include a vial seal inspection device 1155*d* having a user interface generation module 1163*d*, a vial seal inspection configuration data generation module 1164*d*, a vial seal inspection configuration data receiving module 1165*d*, a vial rotation position data receiving module 1166*d*, a vial seal inspection data generation module 1167*d*, a vial seal inspection data storage module 1168*d*, and a vial seal inspection data transmission module 1169*d*, for example, stored on a memory 1162*d* as a set of computer-readable instructions. In any event, the modules 1163*d*-1169*d* may be similar to, for example, the module 1163*a* of FIG. 11A.

Figure 11E:
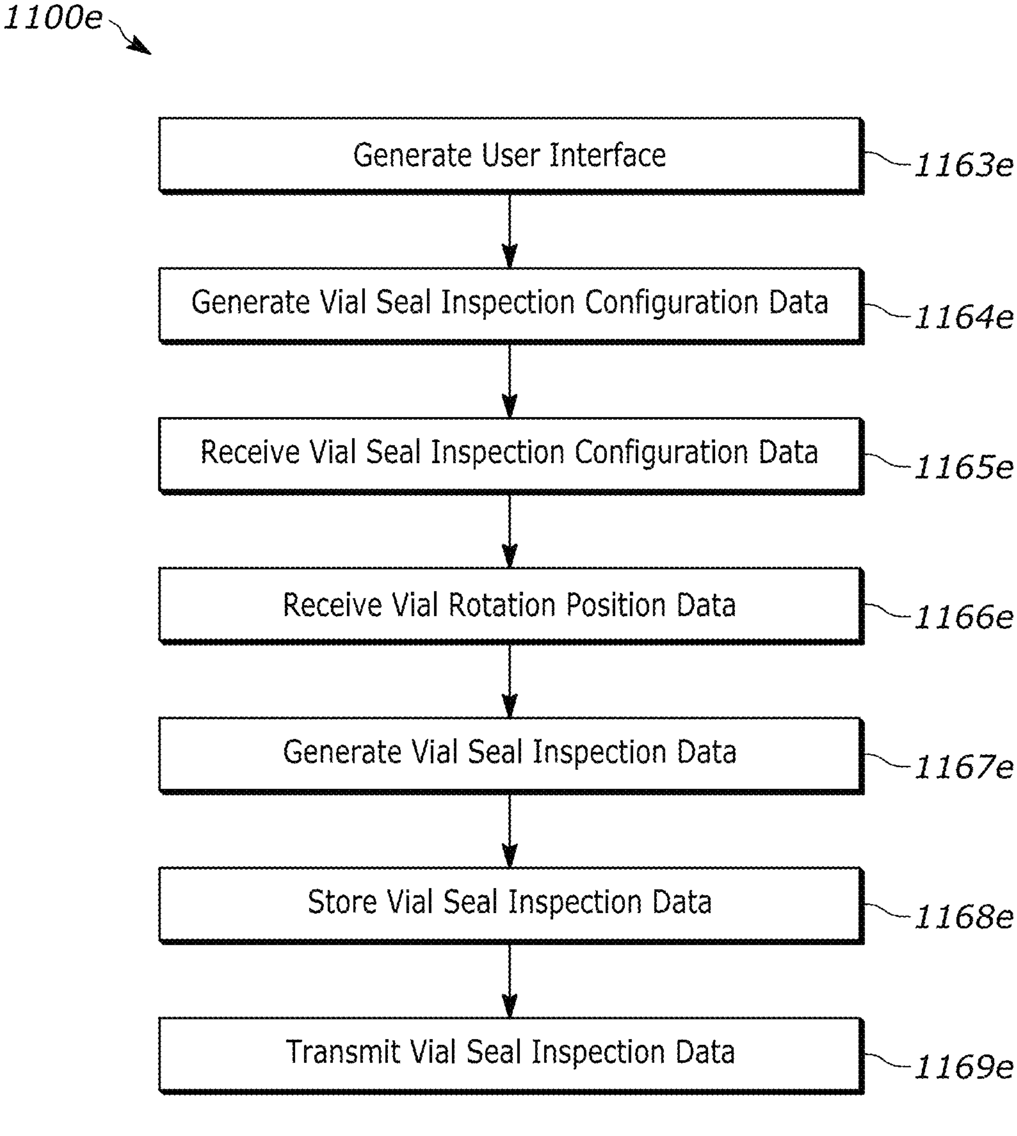
FIG. 11E depicts an example method for implementing a vial seal inspection device.

With reference to FIG. 11E, a method of implementing a vial seal inspection device may be implemented by a processor (e.g., processor 1161*a* of FIG. 11A) executing, for example, at least a portion of modules 1163*d*-1169*d* of FIG. 11D. In particular, processor 1161*a* may execute the user interface generation module 1163*d* to cause the processor 1161*a* to, for example, generate a user interface (block 1163*e*).

The processor 1161*a* may execute the vial seal inspection configuration data generation module 1164*d* to cause the processor 1161*a* to, for example, receive generate vial seal inspection configuration data (block 1164*e*). Vial seal inspection configuration data may include one or more of: a vial identification, a vial seal identification, a vial seal distance data generation device identification, a vial seal crimping system identification, a Z-axis tolerance threshold (e.g., a near alarm 1091*a,b*, a far alarm 1092*a,b*, etc.), an X-axis measurement range, a Y-axis measurement range, a Z-axis measurement range, a vial seal distance data generation sensor stand off-height, a vial seal distance data generation sensor exposure time, a vial seal distance data generation sensor scan rate, a vial seal distance data generation sensor incident angle, vial seal distance data generation sensor perpendicular angle, a vial rotation rate, vial physical dimensions, vial seal physical dimensions, a vial seal surface texture, a vial seal surface color, a vial seal surface coating thickness, a vial seal surface coating material, etc.

The processor 1161*a* may execute the vial seal inspection configuration data receiving module 1165*d* to cause the processor 1161*a* to, for example, receive vial seal inspection configuration data (block 1165*e*). For example, the processor 1161*a* may receive vial seal inspection configuration data from a remote device 1150*a*.

The processor 1161*a* may execute the vial rotation position data receiving module 1166*d* to cause the processor 1161*a* to, for example, receive vial rotation position data (block 1166*e*). Vial seal rotation position data (i.e., vial seal periphery data, X-axis data, etc.) may be, for example, pre-determined (e.g., vial seal periphery data may be based on a perimeter length of at least a portion of a vial seal, vial seal periphery data may be based on a vial rotation time, etc.), and may be manually entered via a user interface 1157*a*. Alternatively, or additionally, the vial seal rotation position data may be generated via, for example, a feedback sensor output. Feedback sensor output data (i.e., X-axis data) may be directly correlated with respective Y-axis data, and Z-axis data. More broadly, processor 1161*a* may generate vial seal 3D data based on correlating Y-axis data and Z-axis data, from a vial seal distance data generation sensor, with X-axis data, that may be representative of points along at least a portion of a perimeter of a vial seal.

The processor 1161*a* may execute the vial seal inspection data generation module 1167*d* to cause the processor 1161*a* to, for example, generate vial seal inspection data (block 1167*e*). The vial seal inspection data may be representative to, for example, Y-axis data, Z-axis data, vial seal 3D data, a vial seal acceptable, a vial seal reject, a probability that a vial seal is acceptable, a probability that a vial seal crimp is acceptable, etc. Additionally, or alternatively, the processor 1161*a* may generate vial seal inspection data based on a comparison of a current Z-axis value with a Z-axis tolerance threshold.

The processor 1161*a* may execute the vial seal inspection data storage module 1168*d* to cause the processor 1161*a* to, for example, store vial seal inspection data (block 1168*e*). The processor 1161*a* may execute the vial seal inspection data transmission module 1169*d* to cause the processor 1161*a* to, for example, transmit vial seal inspection data (block 1169*e*).

Figure 11F:
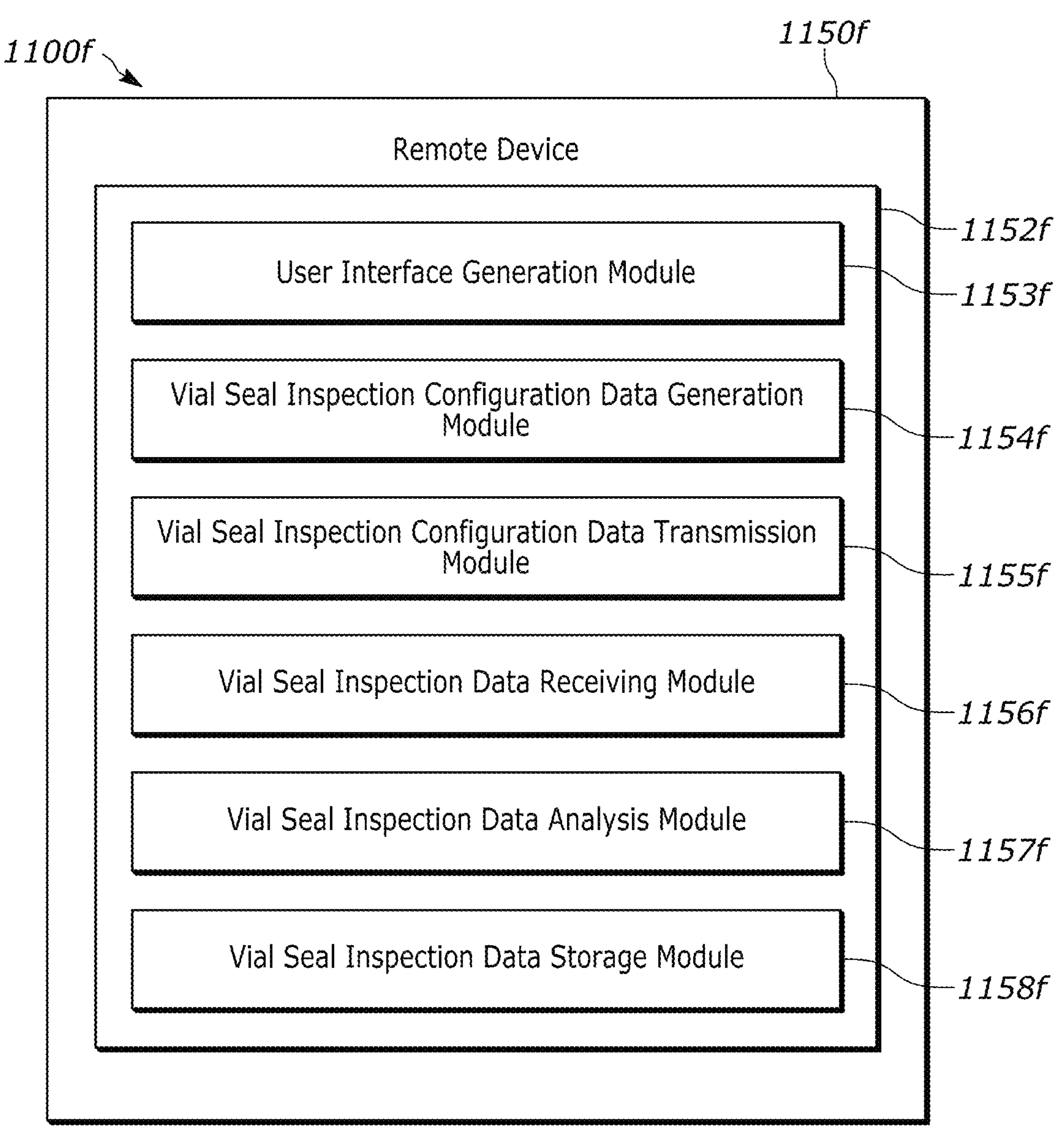
FIG. 11F depicts a block diagram of an example remote device.

Turning to FIG. 11F, a vial seal inspection system 1100*f* may include a remote device 1150*f* having a user interface generation module 1153*f*, a vial seal inspection configuration data generation module 1154*f*, a vial seal inspection configuration data transmission module 1155*d*, a vial seal inspection data generation module 1156*f*, a vial seal inspection data storage module 1157*f*, and a vial seal inspection data transmission module 1158*f*, for example, stored on a memory 1162*d* as a set of computer-readable instructions. In any event, the modules 1153*f*-1158*f* may be similar to, for example, the module 1153*a* of FIG. 11A.

Figure 11G:
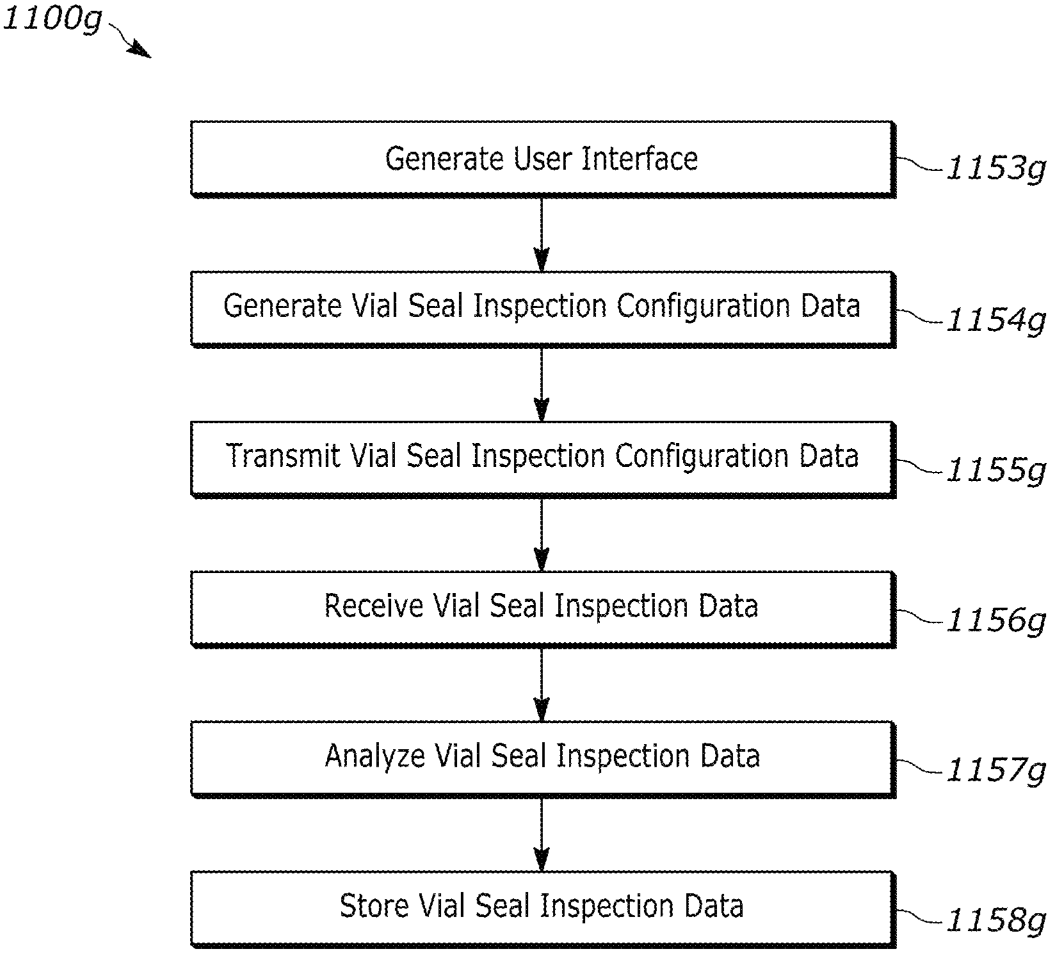
FIG. 11G depicts an example method for implementing a remote device.

With reference to FIG. 11G, a method of implementing a remote device 1100*g* may be implemented by a processor (e.g., processor 1151*a* of FIG. 11A) executing, for example, at least a portion of modules 1153*f*-1158*f* of FIG. 2F. In particular, processor 1151*a* may execute the user interface generation module 1153*f* to cause the processor 1151*a* to, for example, generate a user interface (block 1153*g*).

The processor 1151*a* may execute the vial seal inspection configuration data generation module 1154*f* to cause the processor 1151*a* to, for example, generate vial seal inspection configuration data (block 1154*g*). Vial seal inspection configuration data may include one or more of: a vial identification, a vial seal identification, a vial seal distance data generation device identification, a vial seal crimping system identification, a Z-axis tolerance threshold (e.g., a near alarm 1091*a,b*, a far alarm 1092*a,b*, etc.), an X-axis measurement range, a Y-axis measurement range, a Z-axis measurement range, a vial seal distance data generation sensor stand off-height, a vial seal distance data generation sensor exposure time, a vial seal distance data generation sensor scan rate, a vial seal distance data generation sensor incident angle, vial seal distance data generation sensor perpendicular angle, a vial rotation rate, vial physical dimensions, vial seal physical dimensions, a vial seal surface texture, a vial seal surface color, a vial seal surface coating thickness, a vial seal surface coating material, etc. The processor 1151*a* may execute the vial seal inspection configuration data transmission module 1155*f* to cause the processor 1151*a* to, for example, transmit vial seal inspection configuration data to a vial seal inspection sensor 1180*a* or a vial seal inspection device 1155*a* (block 1155*g*).

The processor 1151*a* may execute the vial seal inspection data receiving module 1156*f* to cause the processor 1151*a* to, for example, receive vial seal inspection data (block 1156*g*). For example, the process 1151*a* may receive vial seal inspection data from a vial seal inspection sensor 1180*a* or vial seal inspection device 1155*a*. The vial seal inspection data may be representative to, for example, Y-axis data, Z-axis data, vial seal 3D data, a vial seal acceptable, a vial seal reject, a probability that a vial seal is acceptable, a probability that a vial seal crimp is acceptable, etc. Additionally, or alternatively, the processor 1151*a* may generate vial seal inspection data based on a comparison of a current Z-axis value with a Z-axis tolerance threshold.

The processor 1151*a* may execute the vial seal inspection data analysis module 1158*f* to cause the processor 1151*a* to, for example, analyze vial seal inspection data (block 1158*g*). For example, the processor 1151*a* may determine a number of false fails based on the vial seal inspection data. The processor 1151*a* may execute the vial seal inspection data storage module 1157*f* to cause the processor 1151*a* to, for example, store vial seal inspection data in a vial seal inspection database 1156*a* (block 1158*g*).

Figure 12:
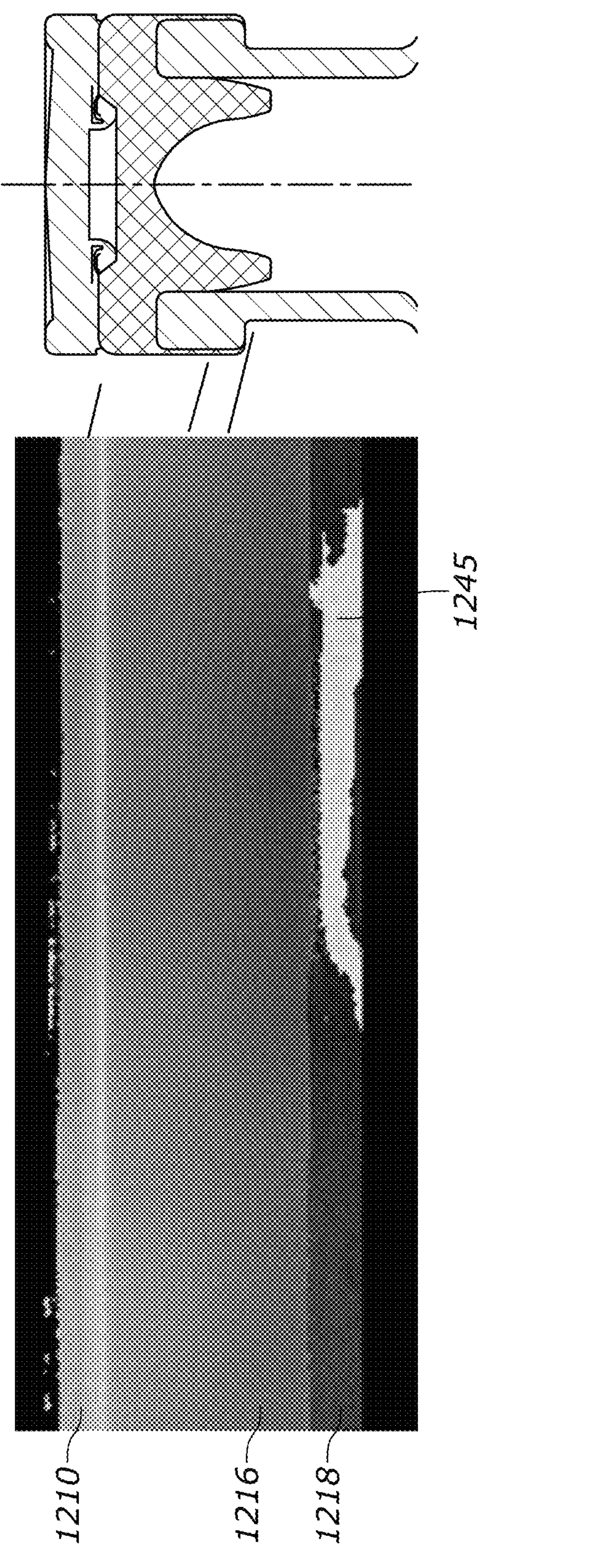
FIG. 12 depicts an example three-dimensional representation of an "unwrapped" vial seal crimp portion.

Turning to FIG. 12, an "unwrapped image" of a 360 degree 3D profile view of a vial seal 1200. The gray scale in the image is representative of Z-axis data. Example the vial seal crimp portion 1218 is representative of a crimp going around a vial lip 117. A processor 1181*a* may generate vial seal 3D data that is representative of a vial seal defect 1245. Additionally, or alternatively, processor 1181*a* may generate vial seal 3D data that is representative of a vial seal crimp angle (or how much of the vial seal is actually crimped) based on X-axis data, Y-axis data, and Z-axis data. The processor 1181*a* may generate vial seal 3D data that is representative of a vial seal upper portion 1210 and/or a vial seal periphery surface 1216 based on X-axis data, Y-axis data, and Z-axis data.

Figure 13A:
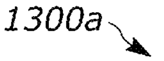
FIGS. 13A and 13B depict an example three-dimensional model of a damaged seal and seal crimp.
Figure 13A:
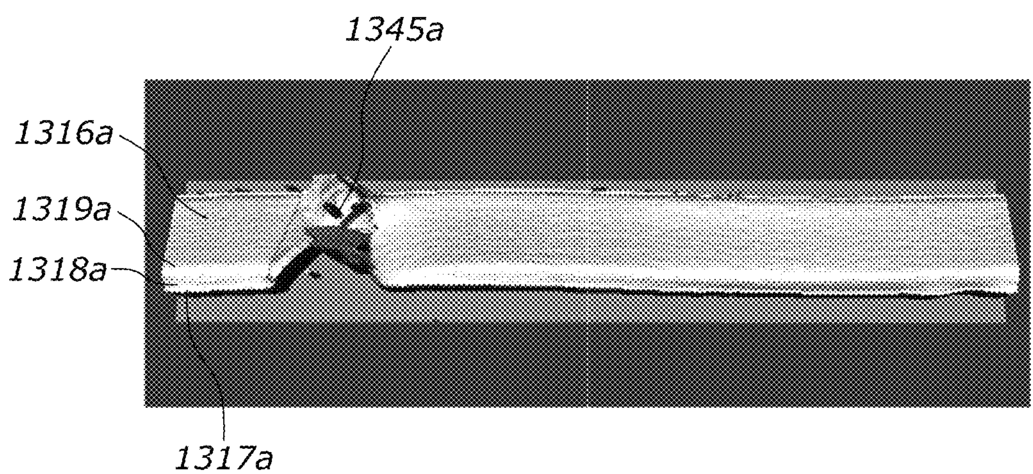
Figure 13B:
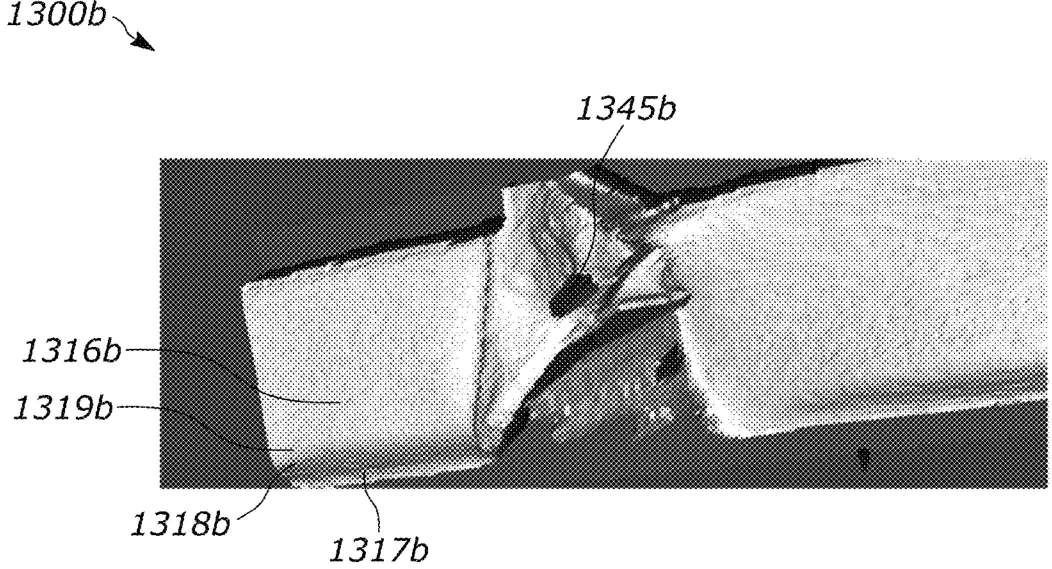

With reference to FIGS. 13A and 13B, a three-dimensional model 1300*a,b* of a vial seal may include a vial seal periphery surface 1316*a,b*, a vial seal lower edge 1317*a,b*, a vial seal crimp surface 1318*a,b*, a vial seal crimp angle 1319*a,b*, and a damaged vial seal area 1345*a,b*. The three-dimensional model 1300*a,b* and/or the damaged vial seal area 1345*a,b* may be based on, for example, on X-axis data, Y-axis data, and Z-axis data.

Figure 14A:
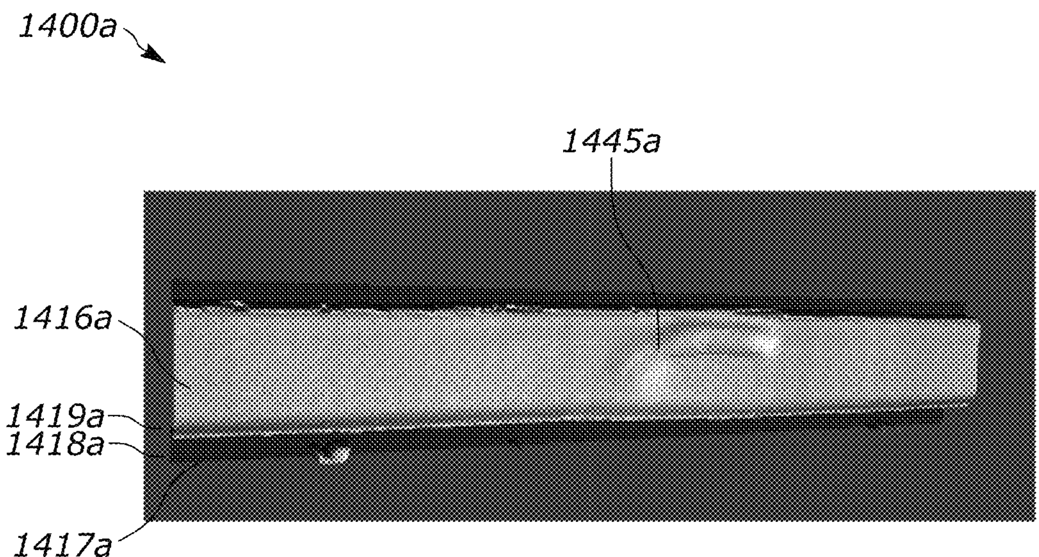
FIGS. 14A and 14B depict an example three-dimensional model of a bruised seal.
Figure 14B:
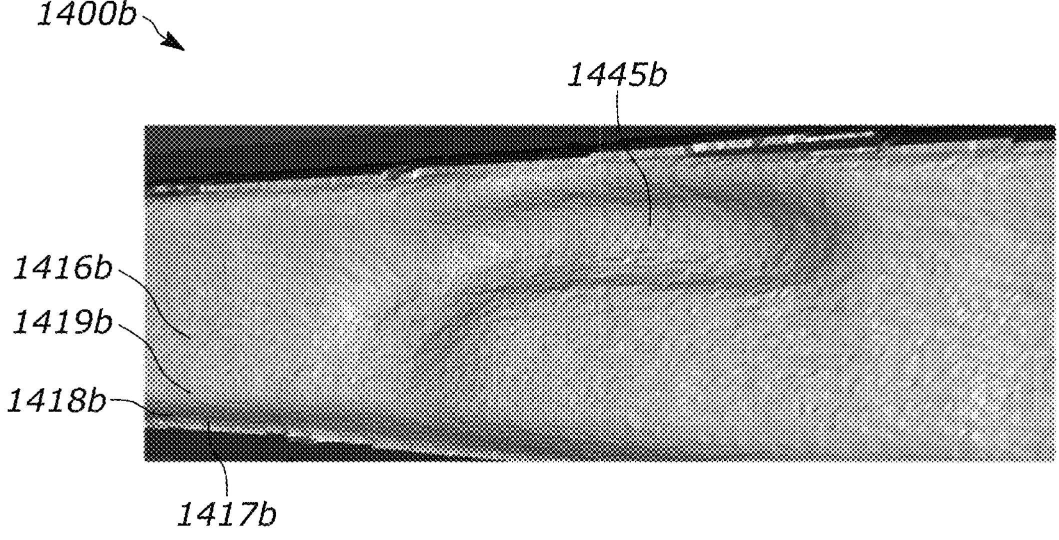

Turning to FIGS. 14A and 14B, a three-dimensional model 1400*a,b* of a vial seal may include a vial seal periphery surface 1416*a,b*, a vial seal lower edge 1417*a,b*, a vial seal crimp surface 1418*a,b*, a vial seal crimp angle 1419*a,b*, and a damaged vial seal area 1445*a,b* (e.g., a bruised seal periphery, etc.). The three-dimensional model 1400*a,b* and/or the damaged vial seal area 1445*a,b* may be based on, for example, on X-axis data, Y-axis data, and Z-axis data.

Figure 15:
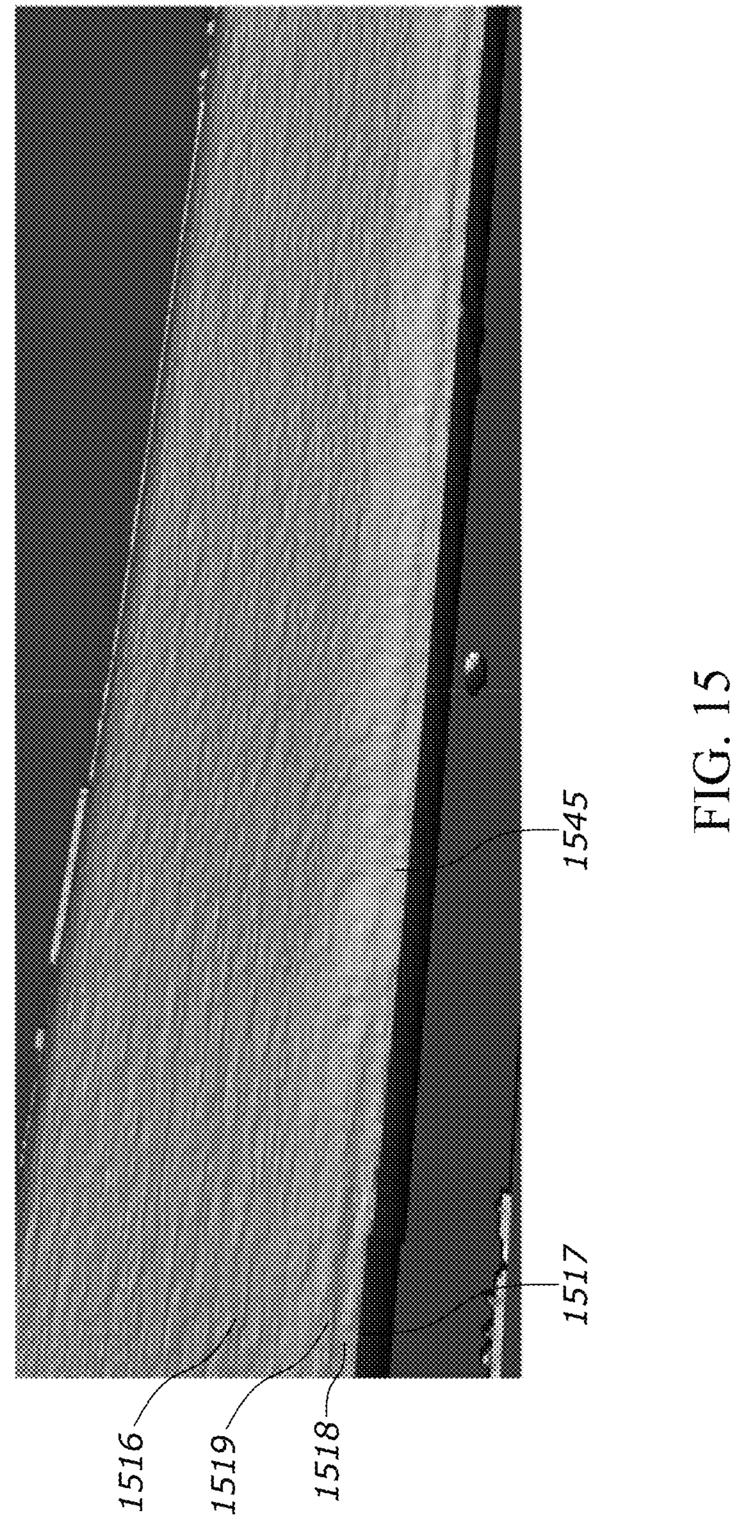
FIG. 15 depicts an example vial seal having a weak crimp portion.

With reference to FIG. 15, a three-dimensional model 1500 of a vial seal may include a vial seal periphery surface 1516, a vial seal lower edge 1517, a vial seal crimp surface 1518, a vial seal crimp angle 1519, and a damaged vial seal area 1545 (e.g., a weak vial seal crimp, etc.). The three-dimensional model 1500 and/or the damaged vial seal area 1545 may be based on, for example, on X-axis data, Y-axis data, and Z-axis data. A vial seal crimp inspection based on 2D images may produce a higher number of erroneous results associated with a weak vial seal crimp compared to a vial seal crimp inspection based on vial seal 3D data. The vial seal 3D may be, for example, representative of a vial seal crimp angle 1519.

Figure 16:
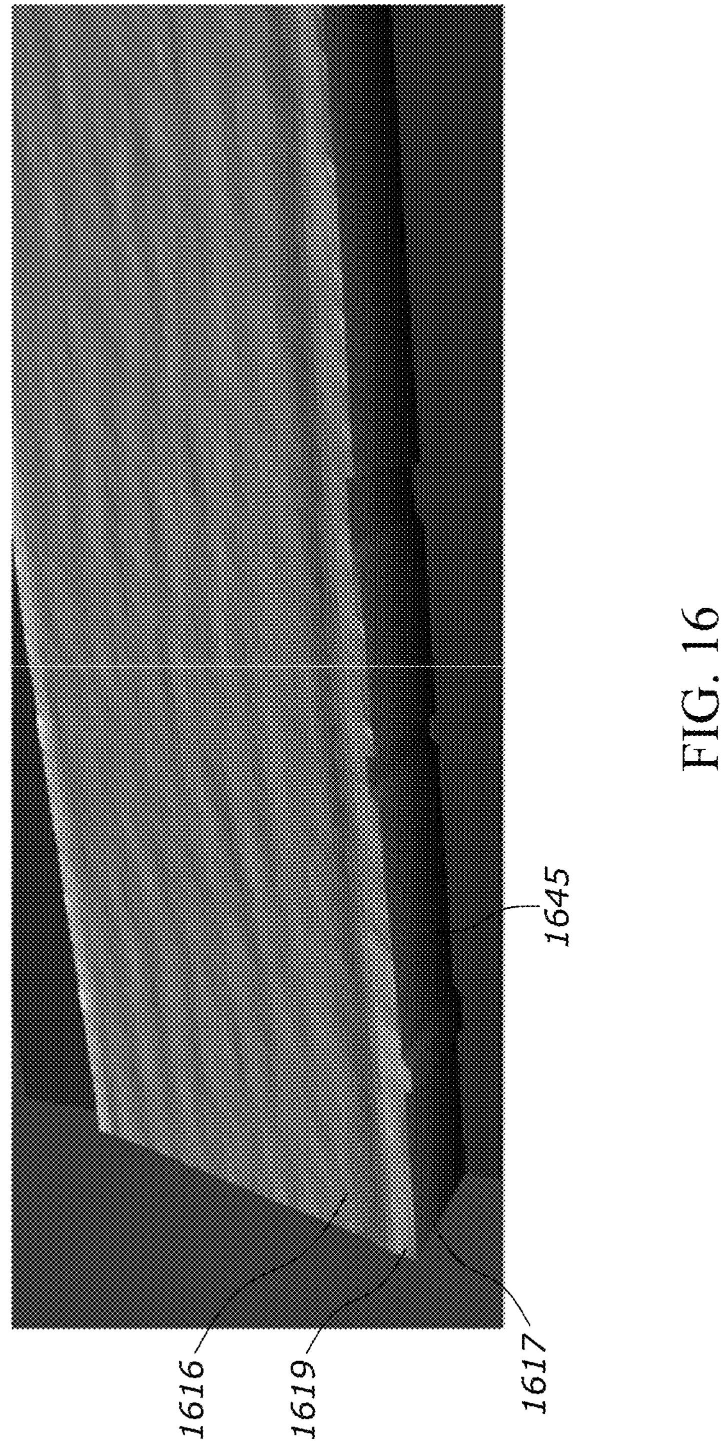
FIG. 16 depicts an example vial seal missing a crimp portion.

Turning to FIG. 16, a three-dimensional model 1600 of a vial seal may include a vial seal periphery surface 1616, a vial seal lower edge 1617, a vial seal crimp surface 1618, a vial seal crimp angle 1619, and a damaged vial seal area 1645 (e.g., a missing vial seal crimp, etc.). The three-dimensional vial seal model 1600 and/or the damaged vial seal area 1645 may be based on, for example, on X-axis data, Y-axis data, and Z-axis data. A vial seal crimp inspection based on 2D images may produce a higher number of erroneous results associated with a missing vial seal crimp compared to a vial seal crimp inspection based on vial seal 3D data. A missing vial seal crimp may be considered a critical fail that is detected with a higher degree of accuracy using the vial seal 3D data. For example, the straight edge 1617 may, for example, indicate no crimp, and that something happened during an associated vial seal crimping process and/or with associated blades.

Figure 17:
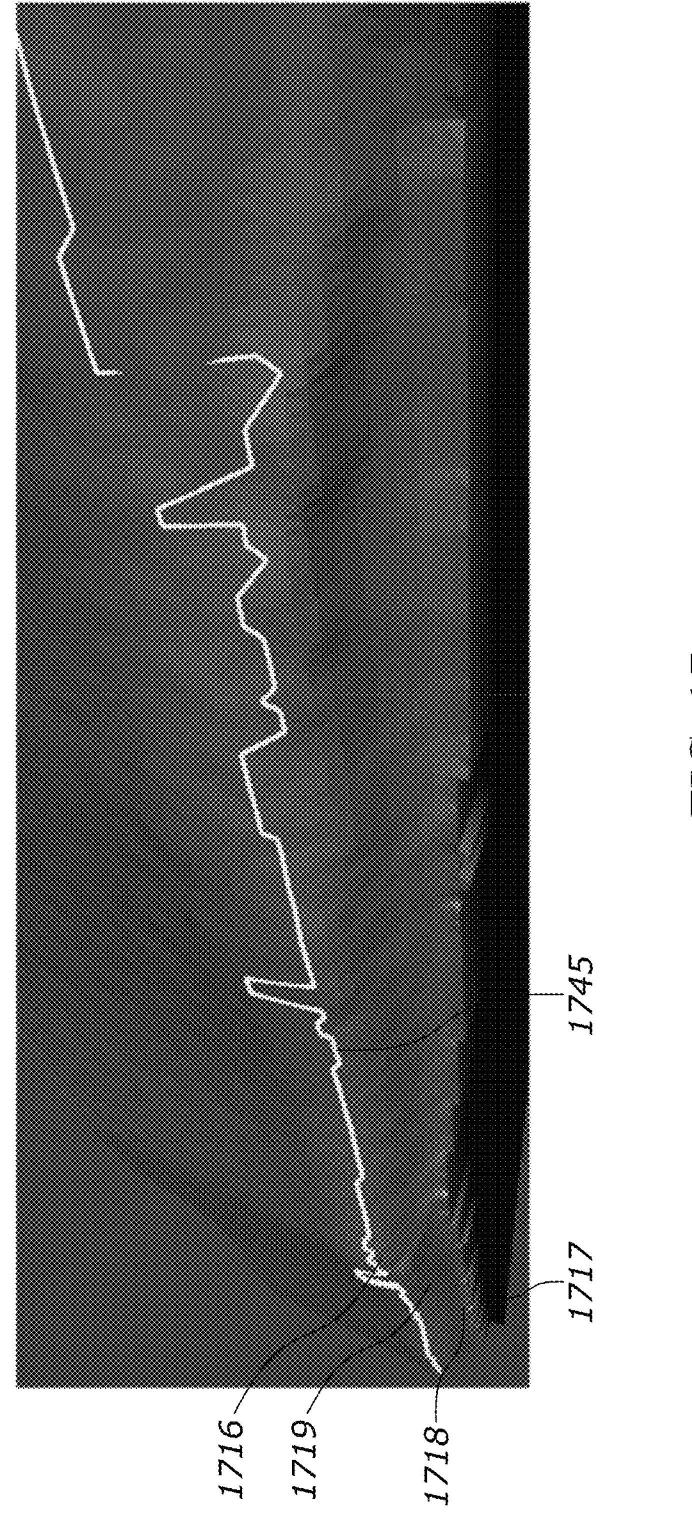
FIG. 17 depicts a three-dimensional model of a full 360 degree profile of a vial seal crimp having 0.1 mm resolution.

With reference to FIG. 17, a three-dimensional vial seal model 1700 of a vial seal may include a vial seal periphery surface 1716, a vial seal lower edge 1717, a vial seal crimp surface 1718, a vial seal crimp angle 1719, and a damaged vial seal area 1745 (e.g., an uneven vial crimp angle, etc.). The three-dimensional vial seal model 1700 and/or the damaged vial seal area 1745 may be based on, for example, on X-axis data, Y-axis data, and Z-axis data. A remote device 1150*a* may, for example, store vial seal 3D data that is representative of a full 360 degree profile of a vial seal crimp down to, for example, 0.1 mm resolution. After scanning at least one vial seal crimp surface, and getting a full 3D 360 degree representative of the vial seal crimp, the remote device, for example, may determine if the vial seal crimp is a fail or not, or may determine a probability of whether the vial seal crimp is acceptable. In any event, a vial seal inspection system 1100*a* may detect larger defects based on, for example, a comparison of Z-axis data with at least one of a near alarm 1091*a,b* and a far alarm 1092*a,b*.

For smaller vials with vial seal crimp defects, a vial seal inspection system 1100*a* may include over 300 scans or lines of a vial seal crimp surface and may, based thereon, generate over 300 consecutive vial seal crimp radius angles. Vial seal 3D data that is representative of a vial seal parameter 1719 is particularly useful for detecting defective vial seal crimp radii. Vial seal 3D data that is representative of a vial seal crimp radii may be used to tune the vial seal inspection system 1100*a* to detect, for example, loose vial seal crimps. Vial seal crimp inspection based on 2D image may not be effective to detect a loose vial seal crimp, i.e., an illumination change may have a false fail with 2D data, but in the case of a vial seal inspection system 1100*a*, illumination may effectively have zero effect on, for example, vial seal Z-axis distance measurements. A vial seal inspection system 1100*a* may receive actual Z-axis measurements, and may calculate a vial seal crimp radius based on corresponding Z-axis data.

A thin colored surface (e.g., 5 μm plastic covering, a blue coating, etc.) may be added to a vial seal outer surface 116, 118, 119. Vial seal 3D data may be based on, for example, vial seal inspection configuration data as illustrated in Table 1. Table 1 incudes ten possible scan speeds for a vial seal distance data generation device 1180*b*. The scan speed may be setup once, and then used in full vial inspection batches. For example, in configuration 2 Conf. #, a vial seal inspection system 1100*a* can give 326 scans or lines over the 360 degrees of the vial seal crimp, providing a resolution of 0.142 mm for the smaller vials (4 cc resolution) and 0.217 mm for the larger vials (50 cc resolution). Vial seal defects may be on an order of millimeters, therefore, a vial seal distance data generation device 1180*a* may be configured with resolution as illustrated in Table 1. Vial seal distance data generation device configuration 2, as shown in bold in Table 1, may work particularly well with vial seals 115 having a blue vial seal periphery surface.

TABLE 1

Ten different settings of the laser system which results in resolutions of the scanned image from 0.11 mm to 0.512 mm

| Conf. # | Lines # | Expo us | Idle us | 4 cc res | 50 cc res |
|---|---|---|---|---|---|
| 0 | 420 | 220 | 30 | 0.110 | 0.168 |
| 1 | 366 | 260 | 30 | 0.126 | 0.193 |
| ***2*** | ***326*** | 300 | 30 | 0.142 | 0.217 |
| 3 | 294 | 340 | 30 | 0.157 | 0.240 |
| 4 | 268 | 380 | 30 | 0.172 | 0.264 |
| 5 | 246 | 420 | 30 | 0.188 | 0.287 |
| 6 | 228 | 460 | 30 | 0.203 | 0.310 |
| 7 | 212 | 500 | 30 | 0.218 | 0.333 |
| 8 | 180 | 600 | 30 | 0.257 | 0.393 |
| 9 | 156 | 700 | 30 | 0.296 | 0.453 |
| 10 | 138 | 800 | 30 | 0.335 | 0.512 |

As illustrated in Table 1, the vial seal distance data received from a corresponding vial seal distance data generation sensor 1080*a*, may be representative of scans or lines and may be used to generate a full 3D image of multiple scans. For example, in the case of a 4 cc vial from Table 1, the vial seal 3D data will have 328 lines.

Figure 18:
FIG. 18 depicts an example image generated using distance data associated with a vial seal inspection for a vial seal having a blue colored periphery surface.
Figure 18:
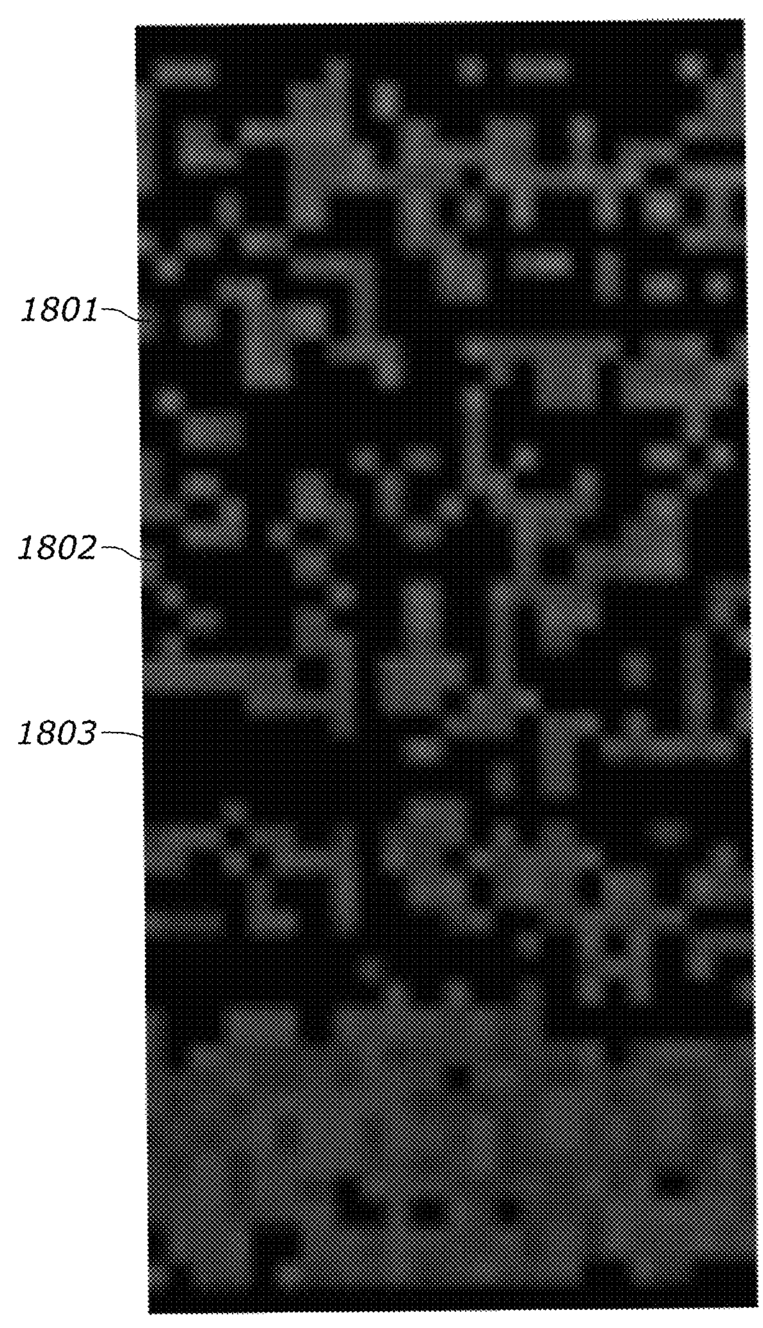

Turning to FIG. 18, dead spots 1801 are representative of areas on an associated vial seal 115 where an associated vial seal distance data generation sensor 1180*a* did not receive a reading. Variations between the areas 1802 and 1803 are representative of vial seal surface 116, 118, 119 variations.

Figure 19:
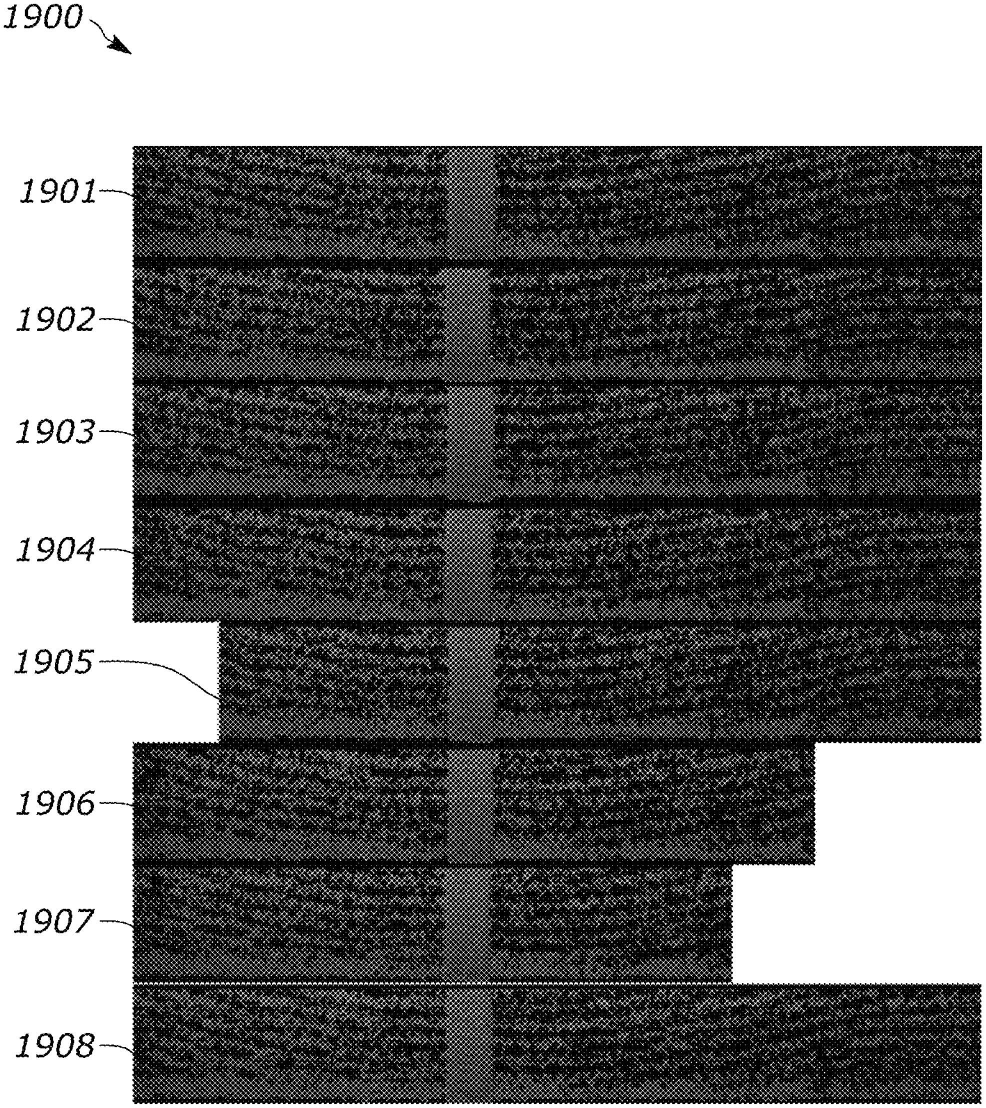
FIG. 19 depicts eight example images generated using distance data associated with a vial seal inspection for a vial seal having a blue colored periphery surface.
Figure 20A:
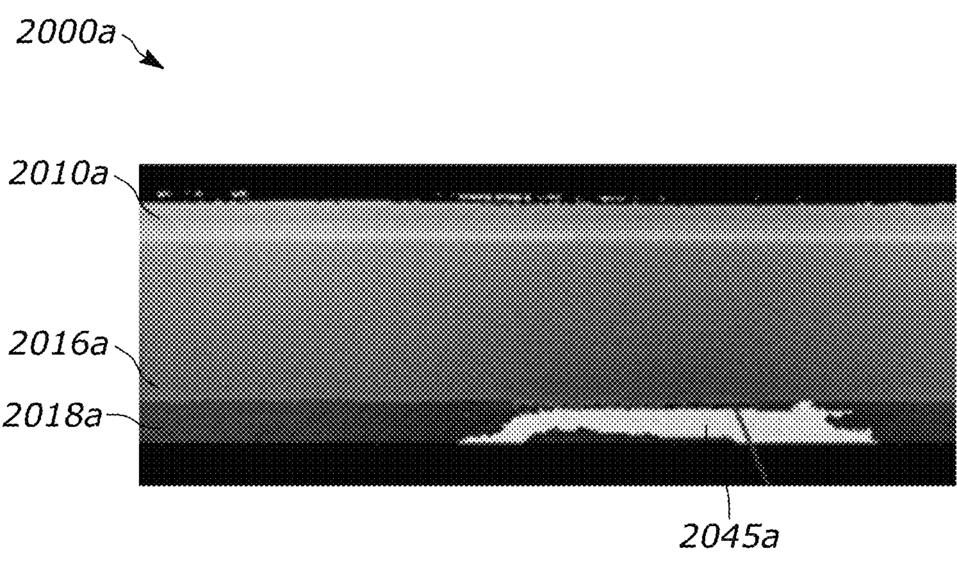
FIGS. 20A-D depict vial seal three-dimensional models using vial seal distance data generated from a laser triangulation sensor with various exposure levels.
Figure 20B:
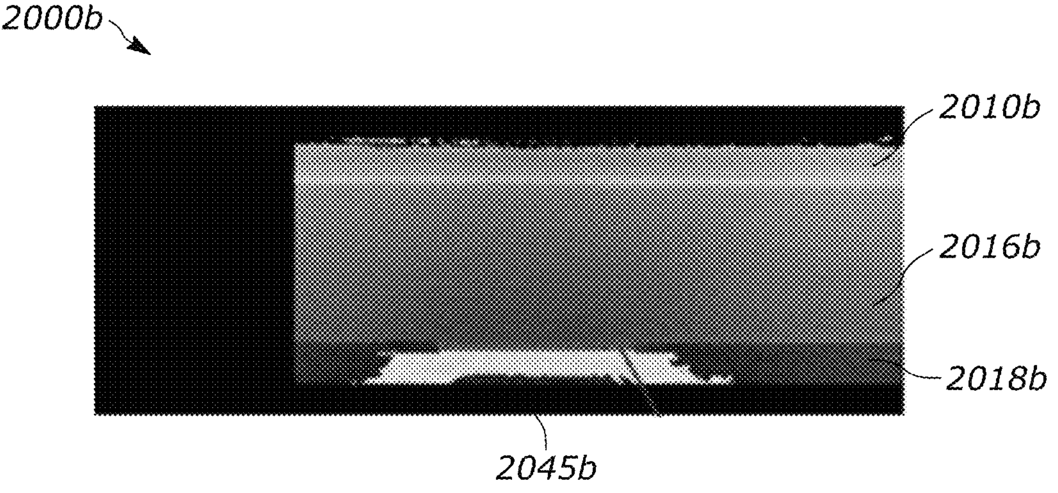
Figure 20C:
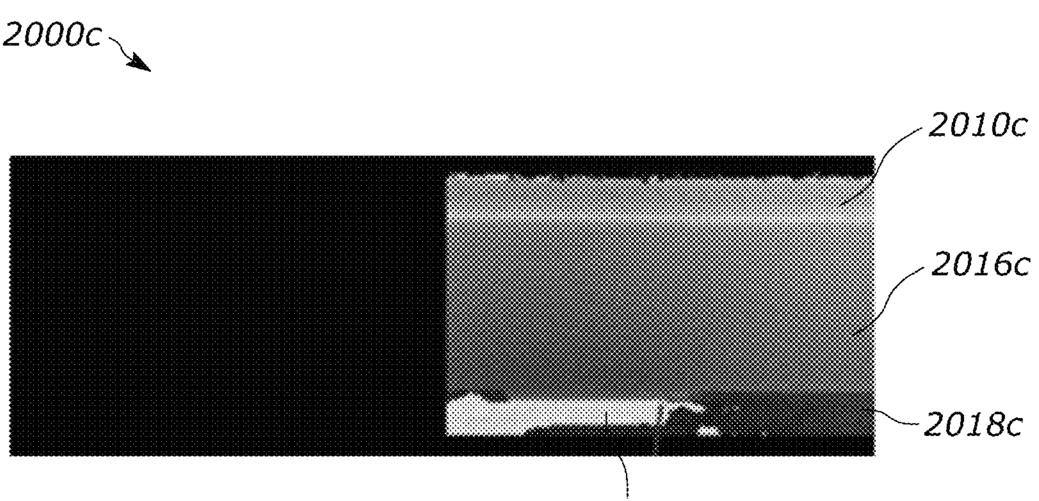
Figure 20D:
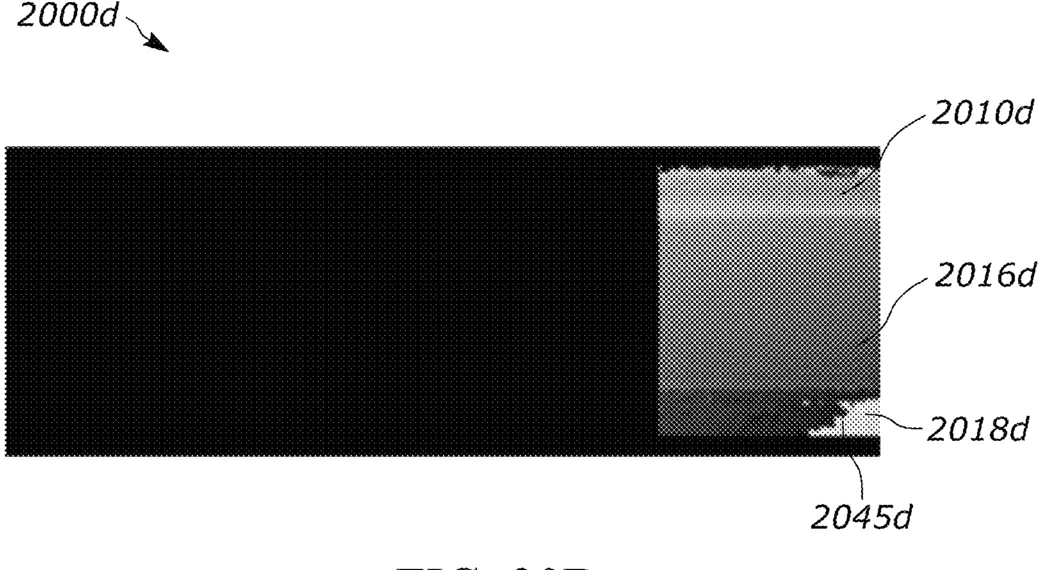

With reference to FIG. 19, vial seal 3D data 1900 may be, for example, representative of eight different scans 1901-1908 of a vial seal, with times and a starting point aligned. The dead spots 1801 may cause excessive vial seal inspection errors.

As illustrated, the eight images 1901-1908 illustrate a pattern where the dead spots 1801 happen. Dead spots 1801 may very based on a vial seal covering color, surface texture, slight variation in the rotation movement of the vial, etc.

Turning to FIGS. 20A-D, vial seal three-dimensional models 2000*a-d* are representative of vial seal 3D data acquired from a vial seal distance data generation device 1180*a* with various exposure levels. As illustrated, increased exposure may reduce false fails. Dead spots 1801 may be generated by decreasing the exposure. A vial seal distance data generation device 1180*a* may be configured with a resolution that is based on a vial seal surface color and/or texture. For example, a thin film thickness on a surface of a vial seal may be approximately 5 micron (This is a typical value for a vial seal anodized aluminum coating). A vial seal distance data generation sensor may be, for example, configured with an incident angle of 20 degree, a refractive index of the film n may be approximately 1.5, and a wavelength of 658 nm, a minimal thickness needed to cause destructive interference (black spot in the images) may be determined. For example, a travel d of a laser beam 1082*a,b* within the coating may be equal to a quarter of the wavelength within the medium plus k times the wavelength itself (i.e. $d=(\lambda/n)/4+k(\lambda/n)$). At an incident angle of 20°, a $(\lambda/n)/4$ the change in thickness may cause destructive interference roughly equal to 105 nm+k(210 nm). As a specific example, four fringes could be caused by a monotone change in thickness of less the 1 micron.

The 3D system may be installed on a qualified visual inspection system in, for example, a computer network (e.g., system 1100*a* of FIG. 11A, etc.).

With reference to FIGS. 21A-D, a series of vial profile views 2100*a*, 2100*c*, and 2100*d* illustrate varying amounts of seal material in the form of crimps 2145*a*, 2145*c*, and 2145*d* (e.g., metal, etc.) tucked under a lip of a vial neck. The vials 2100*a*, 2100*c*, and 2100*d* illustrate a gradual reduction in crimp level. The Laser crimp inspection systems of FIGS. 9A-11G may, for example, provide a physical dimensional reading of the level of crimp 2145*a*, 2145*c*, and 2145*d*. The vial 2100*a* of FIG. 21B and FIG. 21A, which is a detail view of FIG. 21B, includes crimp 2145*a* having an amount of material (e.g., metal, etc.) that is tucked under a vial neck on a typical well sealed vial. The laser system 900*a*-11G may, for example, detect/measure a dimension (marked "A" in FIG. 21A) of the crimp 2145*a*, 2145*c*, 2145*d* to determine the level of crimp and identify whether sub-optimal sealing and sealing defects exist. For example, in FIGS. 21C and 21D, the vials 2100*c* and 2100 include a level of crimp 2145*c* and 2145*d* that is reduced relative to crimp 2145*a* and, as such, the Laser crimp inspection system of FIGS. 9A-11G, for example, may identify these as possessing sub-optimal sealing and/or sealing defects. That is, in FIGS. 21C and 21D, the crimps 2145*c* and 2145*d* include an amount of tuck (i.e., a dimension A of the associated crimp) that can be seen to gradually decrease to the point that any seal intended to be present by the crimp may be compromised.

Although the devices, systems, assemblies, components, subsystems and methods have been described in terms of exemplary embodiments, they are not limited thereto. The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. A vial seal inspection system, the system comprising:

a laser triangulation device configured to generate vial seal distance data, wherein:

the vial seal distance data is representative of a plurality of distance measurements correlated with points along at least a portion of a line that extends from a top of the vial seal to a bottom edge of the vial seal, and the laser triangulation device has a non-perpendicular scan angle to generate distance measurements including a z-axis distance component;

a first set of computer readable instructions stored on a memory that, when executed by a processor, causes the processor to obtain vial seal periphery data, wherein the vial seal periphery data is representative of a plurality of points along at least a portion of a line that extends around a periphery of the vial seal;

a second set of computer readable instructions stored on a memory that, when executed by a processor, causes the processor to generate vial seal three-dimensional data based on the vial seal distance data and the vial seal periphery data, wherein the vial seal three-dimensional data includes a vial seal lower edge; and a third set of computer readable instructions stored on a memory that, when executed by a processor, causes the processor to generate vial seal inspection data based on a comparison of the vial seal three-dimensional data with previously classified vial seal three-dimensional data, wherein the vial seal inspection data is indicative of whether the vial seal includes a vial seal crimp.

2. The system of claim 1, wherein the laser triangulation device includes at least one laser triangulation sensor.

3. The system of claim 1, wherein the scan angle is manually adjustable to include more of, or less of, either a vial seal periphery surface or a vial seal crimp surface within a measurement range.

4. The system of claim 2, wherein a perpendicular angle of the laser triangulation sensor is representative of an angle between a vial central axis and a line that extends from a laser triangulation sensor near alarm distance point to a laser triangulation sensor far alarm distance point.

5. The system of claim 1, wherein the scan angle is configured to scan a curved surface of a vial seal crimp which extends under a vial lip.

6. The system of claim 1, further comprising:

a fourth set of computer readable instructions stored on a memory, that when executed by a processor, causes the processor to receive vial seal distance data generation device configuration data, wherein the vial seal distance data generation device configuration data is representative of at least one of: a sensor stand-off height, a sensor exposure and a scan rate.

7. A vial seal inspection device, the device comprising:

a sensor configured to generate vial seal distance data, wherein;

the vial seal distance data is representative of a plurality of distance measurements correlated with points along at least a portion of a line that extends from a top of the vial seal to a bottom edge of the vial seal, and the sensor has a non-perpendicular scan angle to generate distance measurements including a z-axis distance component;

a vial seal periphery data, wherein the vial seal periphery data is representative of a plurality of points along at least a portion of a line that extends around a periphery of the vial seal; and a second set of computer readable instructions stored on a memory that, when executed by a processor, causes the processor to generate vial seal three-dimensional data based on the vial seal distance data and the vial seal periphery data, wherein the vial seal three-dimensional data includes a vial seal lower edge.

8. The device of claim 7, wherein the sensor includes at least one laser triangulation sensor.

9. The device of claim 7, wherein the vial seal three-dimensional data is representative of at least one surface of a vial seal or a vial seal crimp.

10. The device of claim 7, wherein the vial seal three-dimensional data is representative of a radii of curvature of a vial seal crimp.

11. The device of claim 7, further comprising:

a third set of computer readable instructions stored on a memory, that when executed by a processor, causes the processor to receive vial seal distance data generation device configuration data, wherein the vial seal distance data generation device configuration data is representative of at least one of: a sensor stand-off height, a sensor exposure and a scan rate.

12. The device of claim 7, further comprising:

a fourth set of computer readable instructions stored on a memory, that when executed by a processor, causes the processor to receive vial seal perimeter distance data.

13. The device of claim 12, wherein the vial seal perimeter distance data is predetermined.

14. A non-transitory computer-readable medium storing computer-readable instructions that, when executed by one or more processors, cause the one or more processors to generate vial seal three-dimensional data, the computer-readable medium comprising:

a first set of computer readable instructions that, when executed by a processor, causes the processor to receive vial seal distance data from a laser triangulation device, wherein;

the vial seal distance data is representative of a plurality of distance measurements correlated with points along at least a portion of a line that extends from a top of the vial seal to a bottom edge of the vial seal, and the laser triangulation device has a non-perpendicular scan angle to generate distance measurements including a z-axis distance component;

a second set of computer readable instructions that, when executed by a processor, causes the processor to receive vial seal periphery data, wherein the vial seal periphery data is representative of a plurality of points along at least a portion of a line that extends around a periphery of the vial seal; and a third set of computer readable instructions that, when executed by a processor, causes the processor to generate vial seal three-dimensional data based on the vial seal distance data and the vial seal periphery data, wherein the vial seal three-dimensional data includes a vial seal lower edge.

15. The computer-readable medium of claim 14, further comprising:

a fourth set of computer readable instructions, that when executed by a processor, causes the processor to receive vial seal distance data generation device configuration data, wherein the vial seal distance data generation device configuration data is representative of at least one of: a sensor stand-off height, a sensor exposure and a scan rate.

16. The computer-readable medium of claim 14, further comprising:

a fifth set of computer readable instructions stored on a memory, that when executed by a processor, causes the processor to receive vial seal perimeter distance data.

17. The computer-readable medium of claim 16, wherein the vial seal perimeter distance data is based on a vial rotation rate.

18. The computer-readable medium of claim 14, wherein a perpendicular angle of the laser triangulation device is representative of an angle between a vial central axis and a line that extends from a vial seal distance near alarm distance point to a vial seal distance far alarm distance point.

19. The vial seal inspection system of claim 1, wherein to obtain the vial seal periphery data, the first set of computer readable instructions, when executed, cause the processor to receive vial rotation position data.

20. The vial seal inspection system of claim 1, wherein to obtain the vial seal periphery data, the first set of computer readable instructions, when executed, cause the processor to receive manually-entered data.

* * * * *